(12) United States Patent
Trudeau

(10) Patent No.: US 11,571,756 B2
(45) Date of Patent: Feb. 7, 2023

(54) INTERNAL PILE CUTTER

(71) Applicant: Leon Trudeau, Brossard, LA (US)

(72) Inventor: Leon Trudeau, Brossard, LA (US)

(*) Notice: Subject to any disclaimer, the term of this patent is extended or adjusted under 35 U.S.C. 154(b) by 0 days.

(21) Appl. No.: 17/186,488

(22) Filed: Feb. 26, 2021

(65) Prior Publication Data

US 2021/0180279 A1    Jun. 17, 2021

Related U.S. Application Data

(63) Continuation-in-part of application No. 16/968,361, filed as application No. PCT/US2019/019841 on Feb. 27, 2019.

(60) Provisional application No. 62/639,204, filed on Mar. 6, 2018.

(51) Int. Cl.
*B23D 21/14* (2006.01)
*E02D 9/00* (2006.01)

(52) U.S. Cl.
CPC ............ *B23D 21/14* (2013.01); *E02D 9/005* (2013.01); *Y10T 83/384* (2015.04)

(58) Field of Classification Search
CPC ... Y10T 83/398; Y10T 83/384; Y10T 83/385; Y10T 83/386; E02D 9/005; E02D 9/04; B23D 21/14; B23D 21/00; B26D 3/163; B26D 3/164; B26D 3/165; F15B 11/17; F15B 15/24; F15B 221/20576; F15B 221/7051; F15B 221/71
See application file for complete search history.

(56) References Cited

U.S. PATENT DOCUMENTS

| 2,743,781 | A |   | 5/1956  | Lane    |             |
|-----------|---|---|---------|---------|-------------|
| 3,992,777 | A | * | 11/1976 | Perkins | B23D 29/007 |
|           |   |   |         |         | 30/182      |
| 4,768,899 | A |   | 9/1988  | Dysarz  |             |
| 5,139,006 | A |   | 8/1992  | Trudeau |             |
| 5,245,982 | A |   | 9/1993  | Trudeau |             |

(Continued)

FOREIGN PATENT DOCUMENTS

KR    100790006 B1    1/2008

OTHER PUBLICATIONS

International Search Report for PCT/US2019/019841 dated May 8, 2019 (2 pages).

(Continued)

*Primary Examiner* — Phong H Nguyen
(74) *Attorney, Agent, or Firm* — Fitch, Even, Tabin & Flannery, LLP

(57) ABSTRACT

An assembly to cut a hollow piling has a pressurized hydraulic fluid supply force to cut through a piling; a housing having a cavity to receive the hydraulic fluid, the housing having at least one cylinder wall; at least one piston assembly slidably disposed within the at least one cylinder wall configured to extend from the at least one cylinder wall in response to the introduction of pressurized hydraulic fluid into the housing cavity; a blade attached at a radially distal end of the piston assembly, whereby as the blade extends, a cutting force is applied to an encountered piling wall; wherein the blade edges are stepped/shingled on the upper and lower surface to allow overlapping of the blades when the blades are retracted. Spacers extend to a diameter equal to or beyond a blade tip diameter in its retracted position; and wherein the blade has a piercing point.

13 Claims, 40 Drawing Sheets

(56) References Cited

U.S. PATENT DOCUMENTS

| | | | |
|---|---|---|---|
| 5,413,086 A | 5/1995 | Trudeau | |
| 9,038,723 B2 | 5/2015 | Trudeau et al. | |
| 2011/0290091 A1 | 12/2011 | Clark, II et al. | |
| 2014/0112722 A1 | 4/2014 | Chin | |
| 2014/0157963 A1* | 6/2014 | Von Wirth | E21B 29/12 83/102 |
| 2017/0328159 A1 | 11/2017 | Haugland et al. | |

OTHER PUBLICATIONS

Written Opinion of the ISA for PCT/US2019/019841 dated May 8, 2019 (5 pages).

* cited by examiner

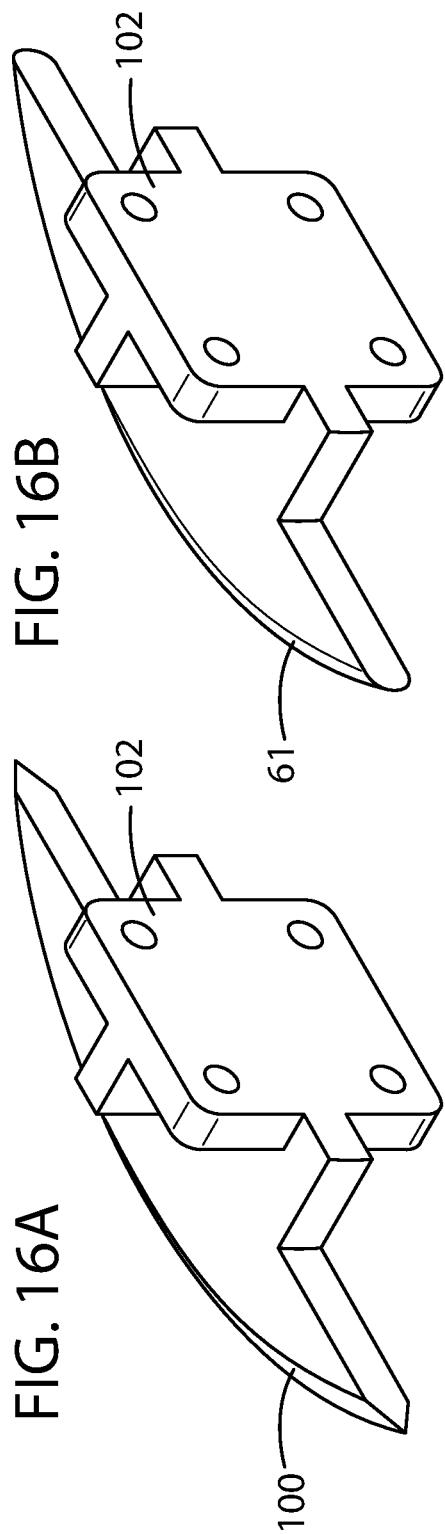

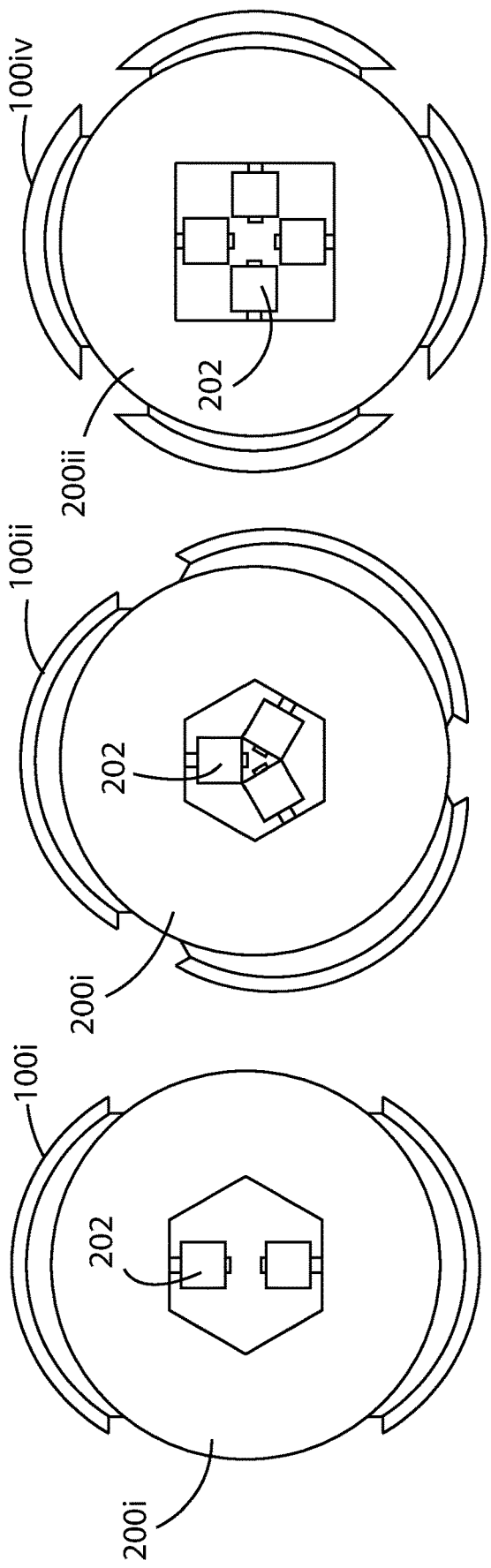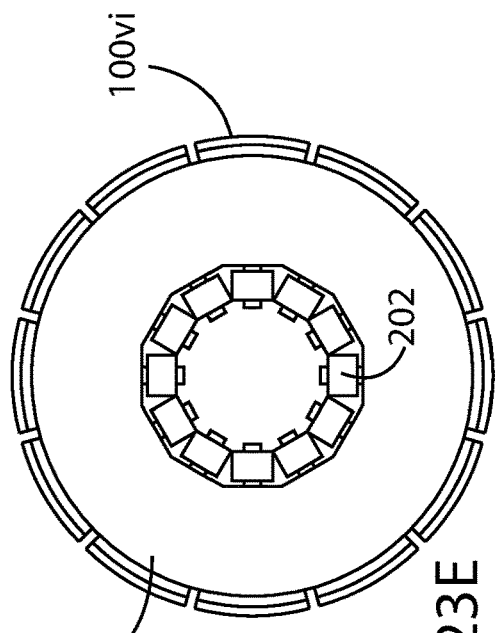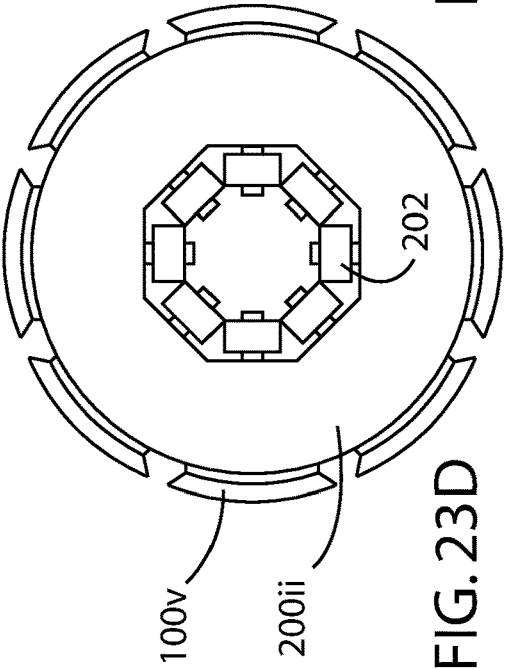

INTERNAL PILE CUTTER

CROSS-REFERENCE TO RELATED APPLICATIONS

This application is a continuation-in-part of U.S. application Ser. No. 16/968,361, filed on Aug. 7, 2020, which is a U.S. national phase application filed under 35 U.S.C. § 371 of International Application No. PCT/US2019/019841, filed Feb. 27, 2019, designating the United States, which claims priority from U.S. Provisional Patent Application No. 62/639,204, filed Mar. 6, 2018, which are hereby incorporated herein by reference in their entirety for all purposes.

FIELD

Presented herein are assemblies and methods to internally cut tubes, and the like, such as large scale hollow metal pilings, and in particular internal tube cutters and methods utilizing multiple cutters and methods driven by a common hydraulic source having a separate hydraulic assemblies and methods to retrieve the cutters from an extended position.

BACKGROUND

Various means of cutting tubes and pilings are known, cutting from the outside of the piling, or cutting from the inside of a hollow piling (see generally, U.S. Pat. Nos. 9,038,723; 5,413,086; 5,245,982; and 5,139,006, which are incorporated herein in their entirety). Despite advances in the art there remains a desire and a need in the art to provide economical and effective tools to provide internal cutting capabilities.

SUMMARY

Accordingly, to advance at least the aforementioned deficiencies in the art, described herein are assemblies to internally cut tubes, pilings, and the like.

An assembly to cut a hollow piling may have a pressurized hydraulic fluid supply configured to supply enough force to cut through up to the circumference of a piling having a housing having a cavity to receive the hydraulic fluid, the housing having at least one cylinder wall; at least one piston assembly slidably disposed within the at least one cylinder wall configured to extend from the at least one cylinder wall in response to the introduction of pressurized hydraulic fluid into the housing cavity; and a blade attached at a radially distal end of the piston assembly, whereby as the blade extends through the cylinder wall, a cutting force is applied to an encountered piling wall.

According to one approach, the pressurized hydraulic fluid supply may be in a range up to 20,000 PSI (pounds per square inch), preferably in the range of about 6,000 to 12,000 PSI, and most preferably about 10,000 PSI.

According to one approach, the assembly may further comprise at least one sealing ring on the piston; a fixed piston sealing ring on the cylinder wall radially distal from the at least one piston sealing ring; and a second hydraulic supply between the cylinder wall sealing ring and the at least one piston sealing ring, whereby the hydraulic supply supplies enough force to retract a cutter/piston assembly from an extended position to a retracted position into an unpressurized housing cavity. The pressurized second hydraulic fluid supply can be in a range up to 5,000 PSI (or approximately 750 pounds of force).

In one approach, the housing can be 32 inches, whereby it is sized to cut a 36-inch diameter pipe with a 1 inch thickness (OD 36", ID 34"). In one approach, the housing can be 32 inches, whereby it is sized to cut a 36-inch diameter pipe with a 1-inch thickness (OD 36", ID 34"). In the housings of FIGS. 37 and 52, a 36-inch housing is used for a 42-inch piling.

In one approach, the piston can have a stroke of up to 4.5 inches (i.e., the full travel of the piston along the cylinder, in either direction). The piston/blade assembly may have a stop to limit extending beyond a predetermined stroke.

In one approach the blade may have a rounded edge to crimp rather than cutting through a pipe surface.

In one approach, the blade edges may be stepped on the upper and lower surface to allow overlapping of the blades when the blades are retracted.

In another approach, an assembly to cut a hollow piling, and may have a pressurized hydraulic fluid supply configured to supply enough force to cut through up to the circumference of a piling; a housing having a cavity to receive the hydraulic fluid, the housing having at least one cylinder wall; at least one piston assembly slidably disposed within the at least one cylinder wall configured to extend from the at least one cylinder wall in response to the introduction of pressurized hydraulic fluid into the housing cavity; a blade attached at a radially distal end of the piston assembly, whereby as the blade extends, a cutting force is applied to an encountered piling wall; wherein the blade edges are stepped/shingled on the upper and lower surface to allow overlapping of the blades when the blades are retracted; and wherein the housing has spacers that extend to a diameter equal to or beyond a blade tip diameter in its retracted position; and wherein the blade has a piercing point.

In this embodiment, the pressurized hydraulic fluid supply may be in the range up to 20,000 PSI (pounds per square inch), preferably in the range of about 4,000 to 12,000 PSI, and most preferably about 6,000 PSI.

Also this embodiment may have at least one sealing ring on the piston; a fixed piston sealing ring on the cylinder wall radially distal from the at least one piston sealing ring; and a second hydraulic supply to a cavity bordered by the cylinder wall sealing ring, the at least one piston sealing ring, and a gap between the cylinder and the cylinder wall, whereby the hydraulic supply into supplies enough force to retract a cutter/piston assembly from an extended position to a retracted position into an unpressurized housing cavity.

Also, this embodiment may have the pressurized second hydraulic fluid supply in a range up to 5,000 PSI (or approximately 750 pounds of force). The housing may be 36 inches, whereby it is sized to cut a 42-inch diameter pipe with a 1 inch thickness (OD 42", ID 40"). The piston may have a stroke of up to 5.5 inches. The piston/blade assembly has a stop in a retainer flange ring to limit extending beyond a predetermined stroke. The blade may optionally have a rounded edge to crimp rather than cutting through a pipe surface; an arrow shape to pierce the pile, or a curved edge to slice through the pile.

In one embodiment, the second hydraulic supply enters the second hydraulic supply with in the piston cavity at two points, such as at a top of the cutting head to the top of the piston cavity and at a bottom of the cutting head to deliver hydraulic fluid pressure to the bottom of the piston cavity. The gap between the cylinder and the cylinder wall forming the portion of the piston cavity to receive the second hydraulic supply is between 0.1-4 mm. The two points the second hydraulic supply may be daisy chained from a single hydraulic force.

In another approach, an assembly to cut a hollow piling, and may have a pressurized hydraulic fluid supply configured to supply enough force to force blades through up to the circumference of a piling; a housing having a cavity to receive the hydraulic fluid, the housing having five cylinder walls; five piston assemblies slidably disposed within the five cylinder walls configured to extend from the five cylinder walls in response to the introduction of pressurized hydraulic fluid into the housing cavity; a blade attached at a radially distal end of each of the five piston assemblies, whereby as the blade extends, a cutting force is applied to an encountered piling wall; wherein the blade is attached at an angle to allow overlapping with adjacent blades; wherein the blade edge of each blade is configured to be adjacent to the blade edge of the adjacent blade; and wherein the housing has spacers that extend to a diameter equal to or beyond a blade tip diameter in its retracted position; and wherein the blade has a piercing point.

Other features will become more apparent to persons having ordinary skill in the art to which the assemblies pertain and from the following description and claims.

BRIEF DESCRIPTION OF THE DRAWINGS

FIG. 16A illustrates a perspective view of an exemplary cutter edge of the present embodiments according to another approach with an arched blade.

FIG. 16B illustrates a perspective view of an exemplary cutter edge of the present embodiments according to another approach with a rounded edge to allow crimping.

FIG. 23A illustrates a top view of the present embodiments according to another approach with two blades the hydraulic pistons in an extended position.

FIG. 23B illustrates a top view of the present embodiments according to another approach with three blades the hydraulic pistons in an extended position.

FIG. 23C illustrates a top view of the present embodiments according to another approach with four blades the hydraulic pistons in an extended position.

FIG. 23D illustrates a top view of the present embodiments according to another approach with eight blades the hydraulic pistons in an extended position.

FIG. 23E illustrates a top view of the present embodiments according to another approach with twelve blades the hydraulic pistons in an extended position.

Figure 1:
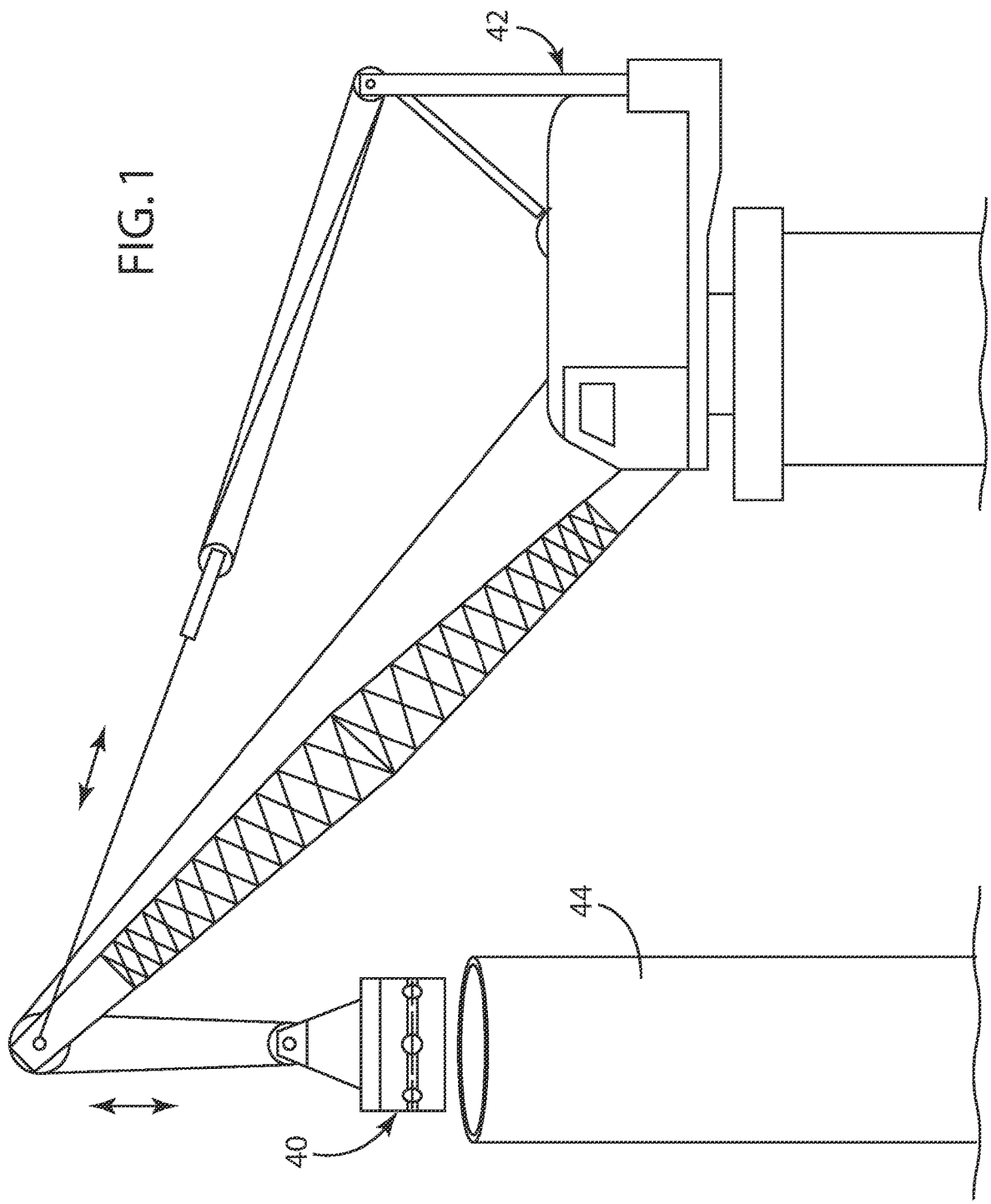
FIG. 1 illustrates a planar view of an internal cutter of one of the present embodiments in use suspended from a crane to be lowered into a hollow piling.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by at least the appended claims.

DETAILED DESCRIPTION

Described herein are assemblies to internally cut pilings and other types of hollow tubes. As shown in the figures, cutting and/or crimping tools are provided with optional assemblies to clamp the tool to the work piece (i.e., the tube of piling) or even to rotate the tool within the workpiece.

FIG. 1 illustrates a planar view of an internal cutter of one of the present embodiments in use suspended from a crane to be lowered into a hollow piling. As shown, a crane 42 may be used to lower the present embodiments 40 within a hollow tube, pile, or pipe 42, such as a metal pipe. The assembly/cutting head 40 should be about 2 inches smaller in its outer diameter than the inner diameter of the tube to be cut. It is also noted that other means of assembly placement are possible, such as pulling the device horizontally through the pipe with a cable.

Figure 2:
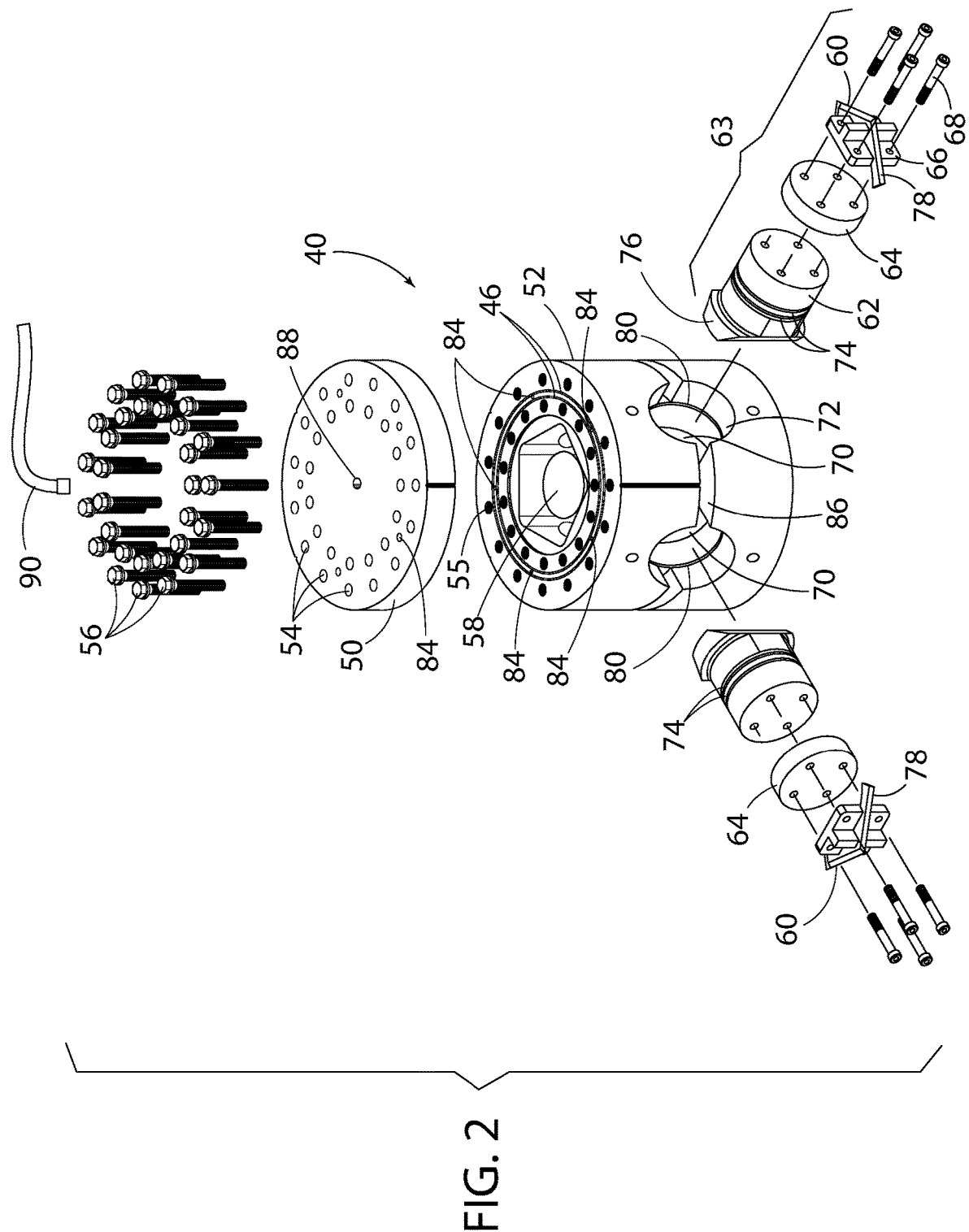
FIG. 2 illustrates an exploded perspective view of an exemplary approach to the present embodiments.
Figure 3:
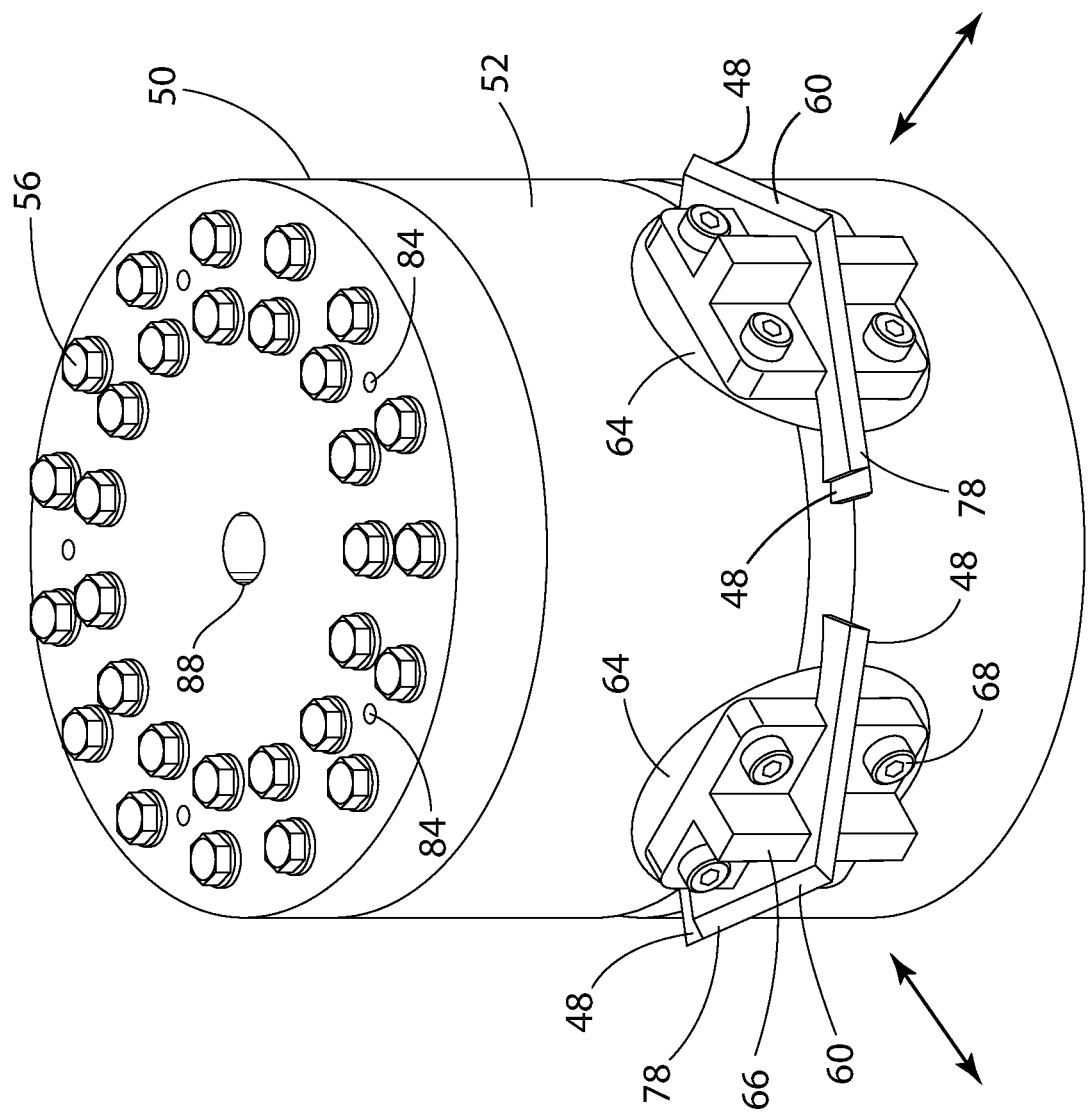
FIG. 3 illustrates an assembled perspective view of the embodiment of FIG. 2.
Figure 4:
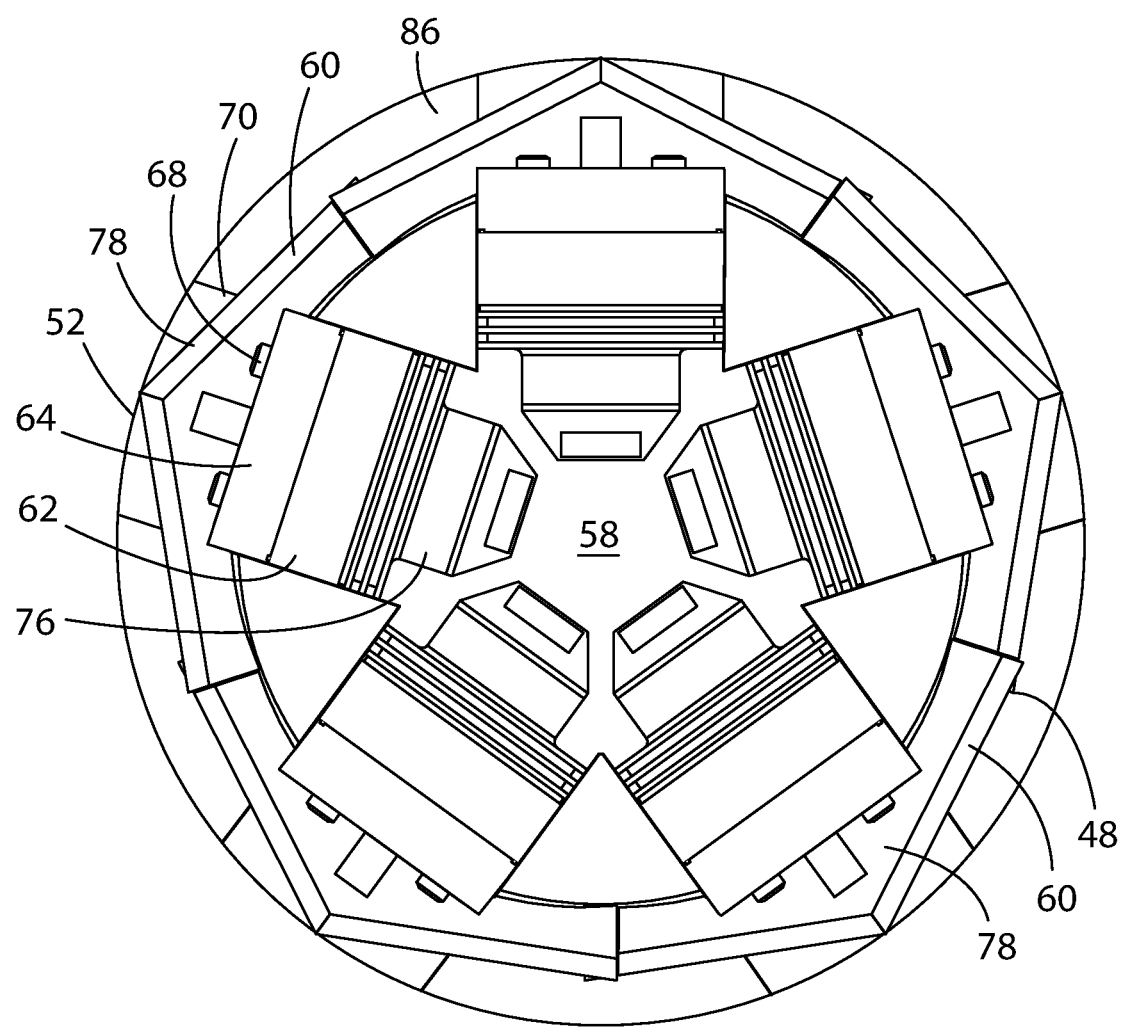
FIG. 4 illustrates a cutaway top view of the embodiment of FIG. 2 with the hydraulic pistons exposed in a retracted position.
Figure 6:
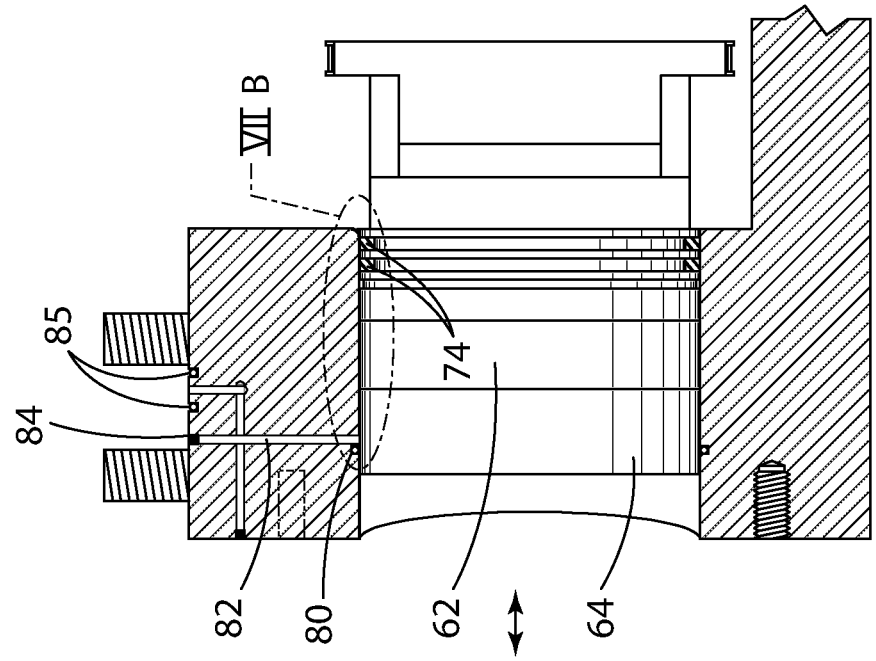
FIG. 6 illustrates a side cutaway view of one of the cylinders of the embodiment of FIG. 2 with the hydraulic piston retracted.
Figure 5:
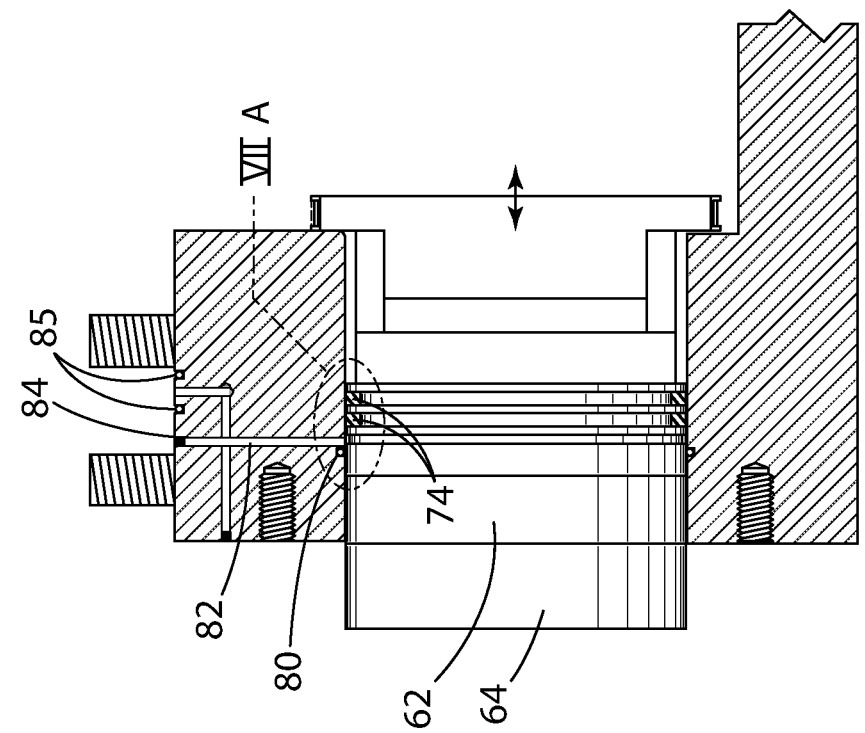
FIG. 5 illustrates a side cutaway view of one of the cylinders of the embodiment of FIG. 2 with the hydraulic piston extended.
Figure 7A:
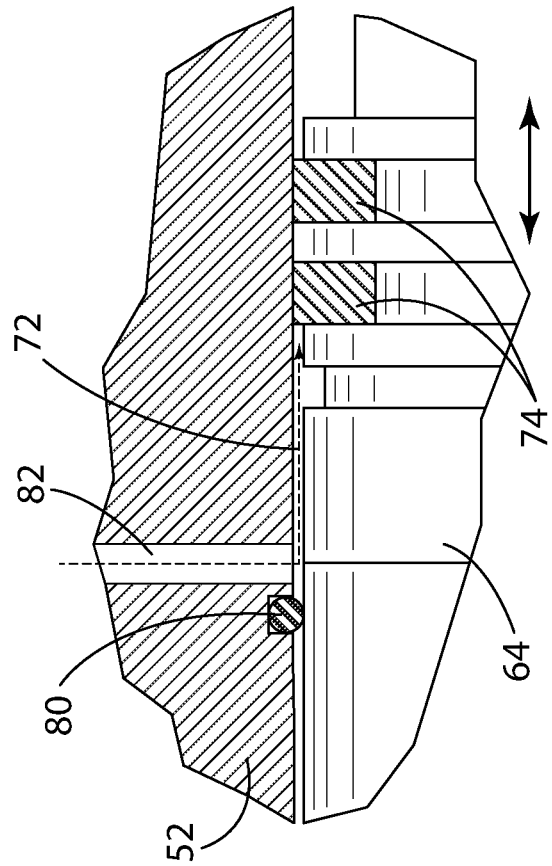
FIG. 7A illustrates a close-up side view of area VII-A in FIG. 5 of a hydraulic configuration to push the extended piston to a retracted position.
Figure 7B:
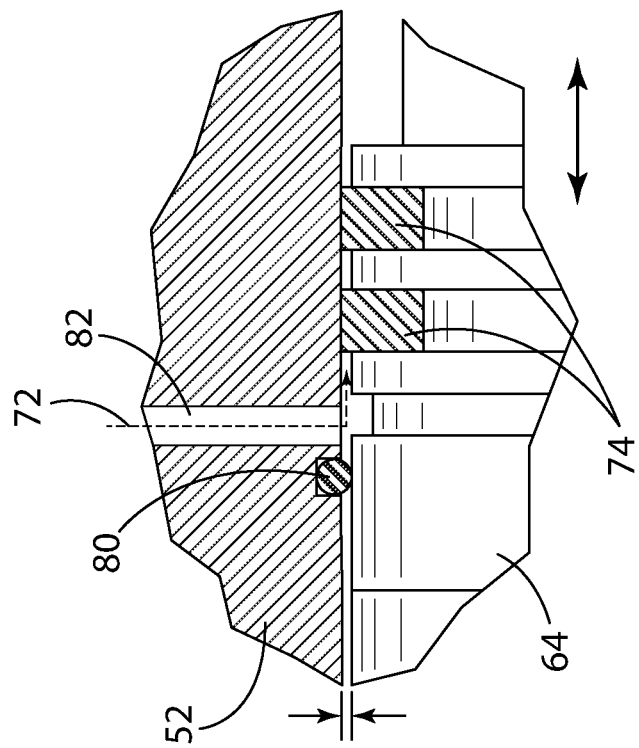
FIG. 7B illustrates a close-up side view of area VII-B in FIG. 6 of a hydraulic configuration to push an extended piston in a retracted position.
Figure 9A:
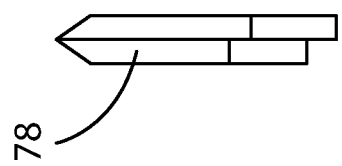
FIG. 9A illustrates a side view of an exemplary cutter of the present embodiments.
Figure 8:
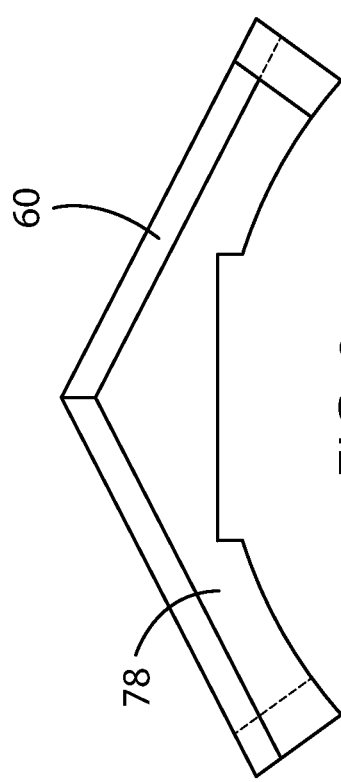
FIG. 8 illustrates a top view of an exemplary cutter of the present embodiments.
Figure 9B:
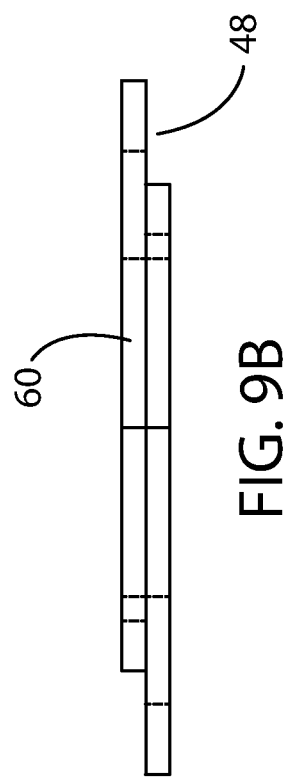
FIG. 9B illustrates a front view of an exemplary cutter of the present embodiments.
Figure 14:
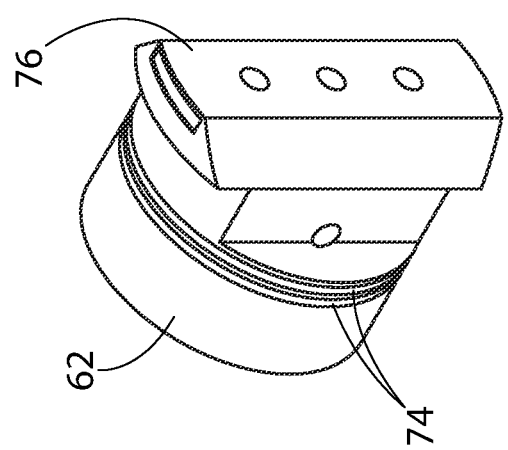
FIG. 14 illustrates a perspective view of an exemplary piston assembly of the present embodiments.
Figure 11:
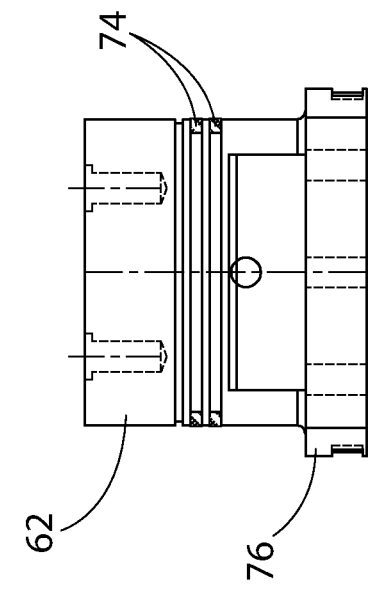
FIG. 11 illustrates a side view of an exemplary piston assembly of the present embodiments.
Figure 13:
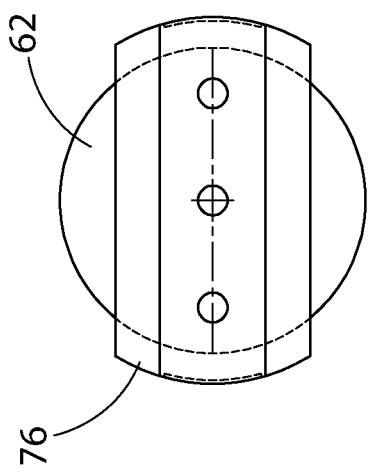
FIG. 13 illustrates a back view of an exemplary piston assembly of the present embodiments.
Figure 10:
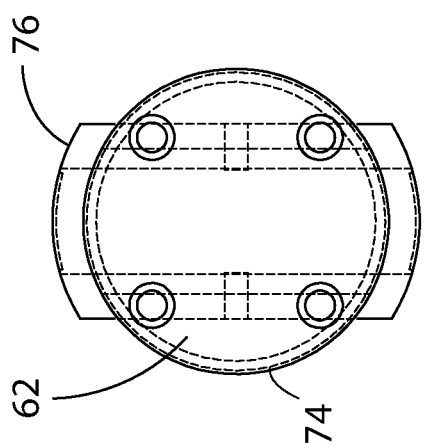
FIG. 10 illustrates a front view of an exemplary piston assembly of the present embodiments.
Figure 12:
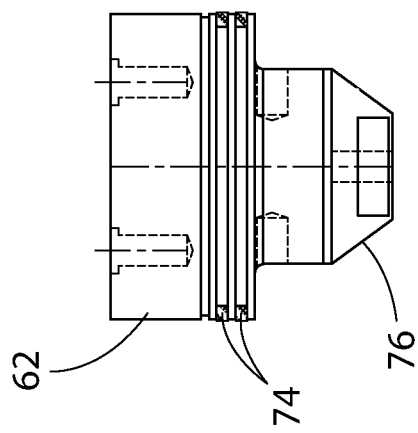
FIG. 12 illustrates a top view of an exemplary piston assembly of the present embodiments.
Figure 15:
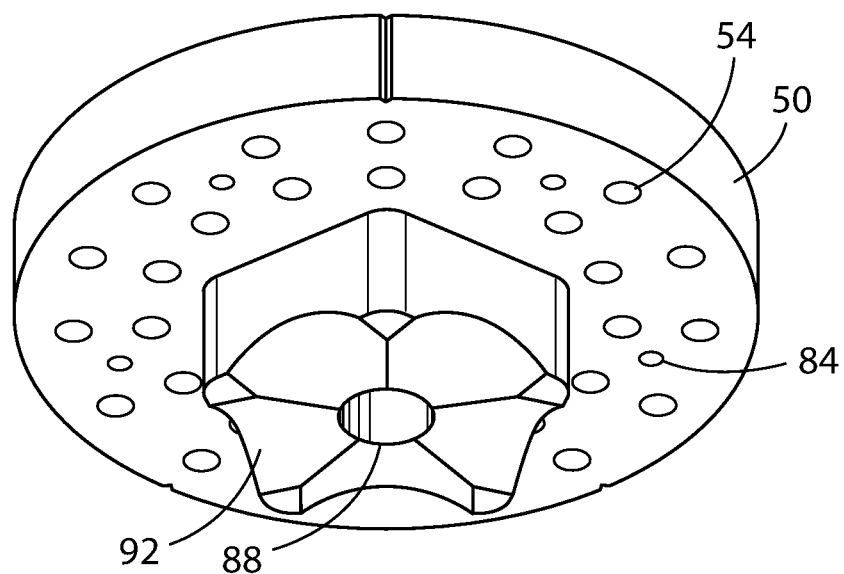
FIG. 15 illustrates a perspective view of an exemplary top plate of the present embodiments.
Figure 18:
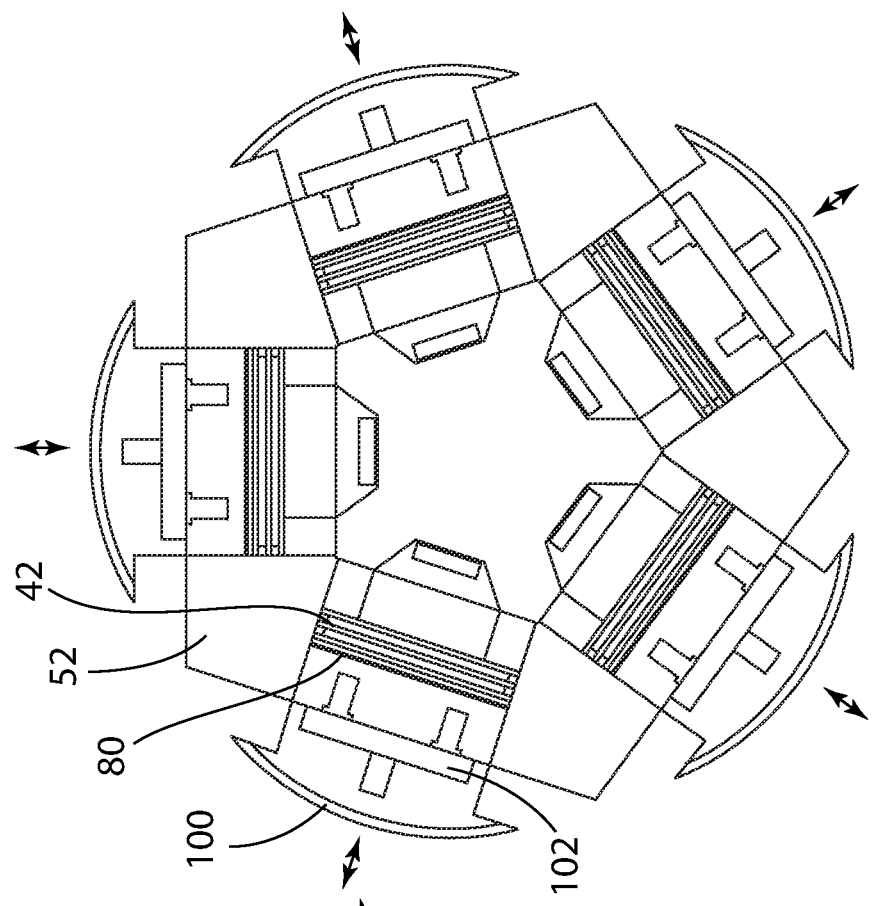
FIG. 18 illustrates a cutaway top view of the present embodiments according to FIG. 17 with the hydraulic pistons exposed in an extended position.
Figure 17:
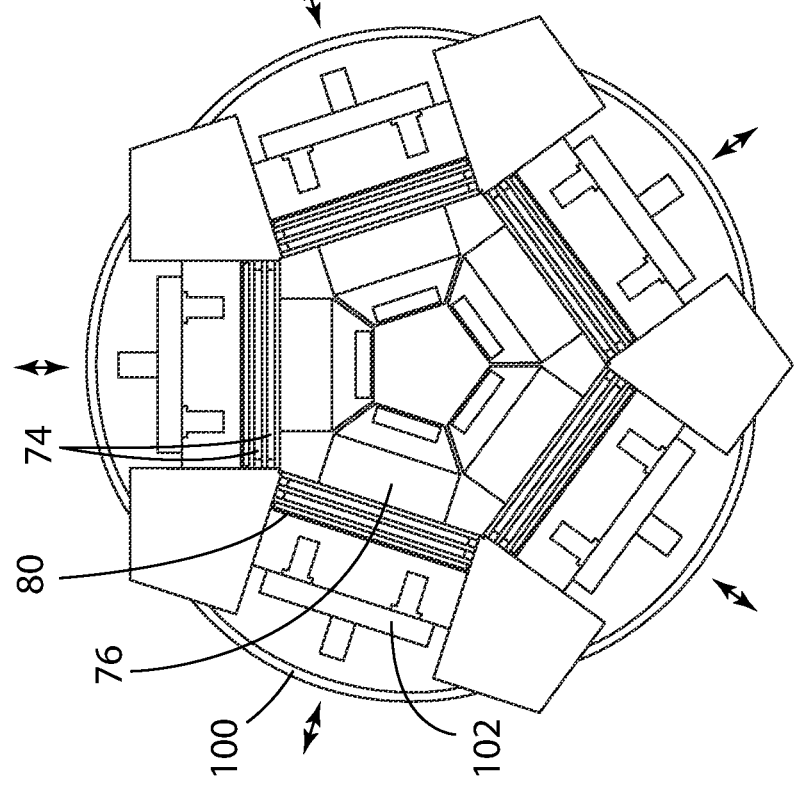
FIG. 17 illustrates a cutaway top view of the present embodiments according to another approach with the hydraulic pistons exposed in a retracted position.
Figure 19:
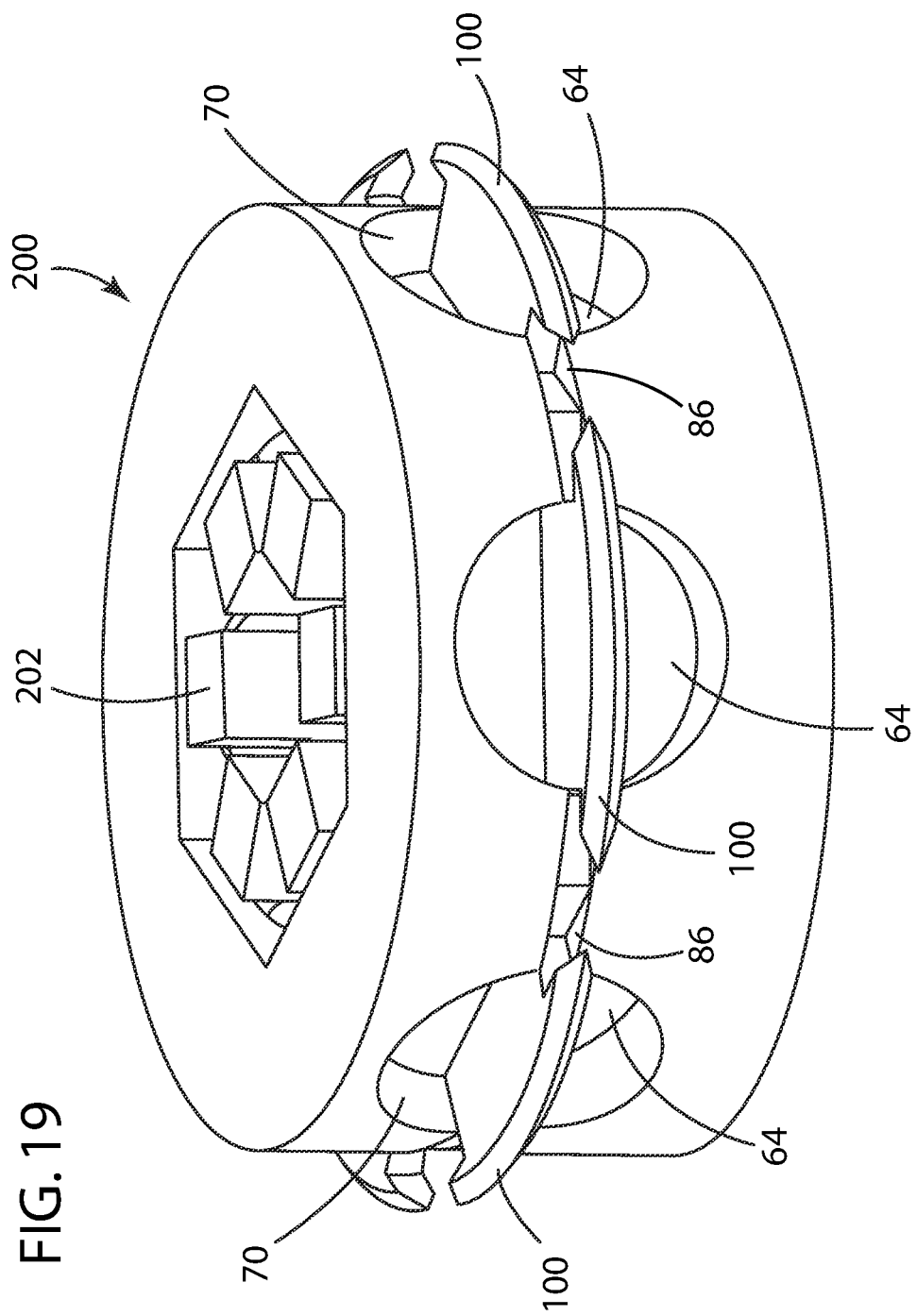
FIG. 19 illustrates a perspective view of the present embodiments according to FIG. 17 with the hydraulic pistons exposed in an extended position.
Figure 20:
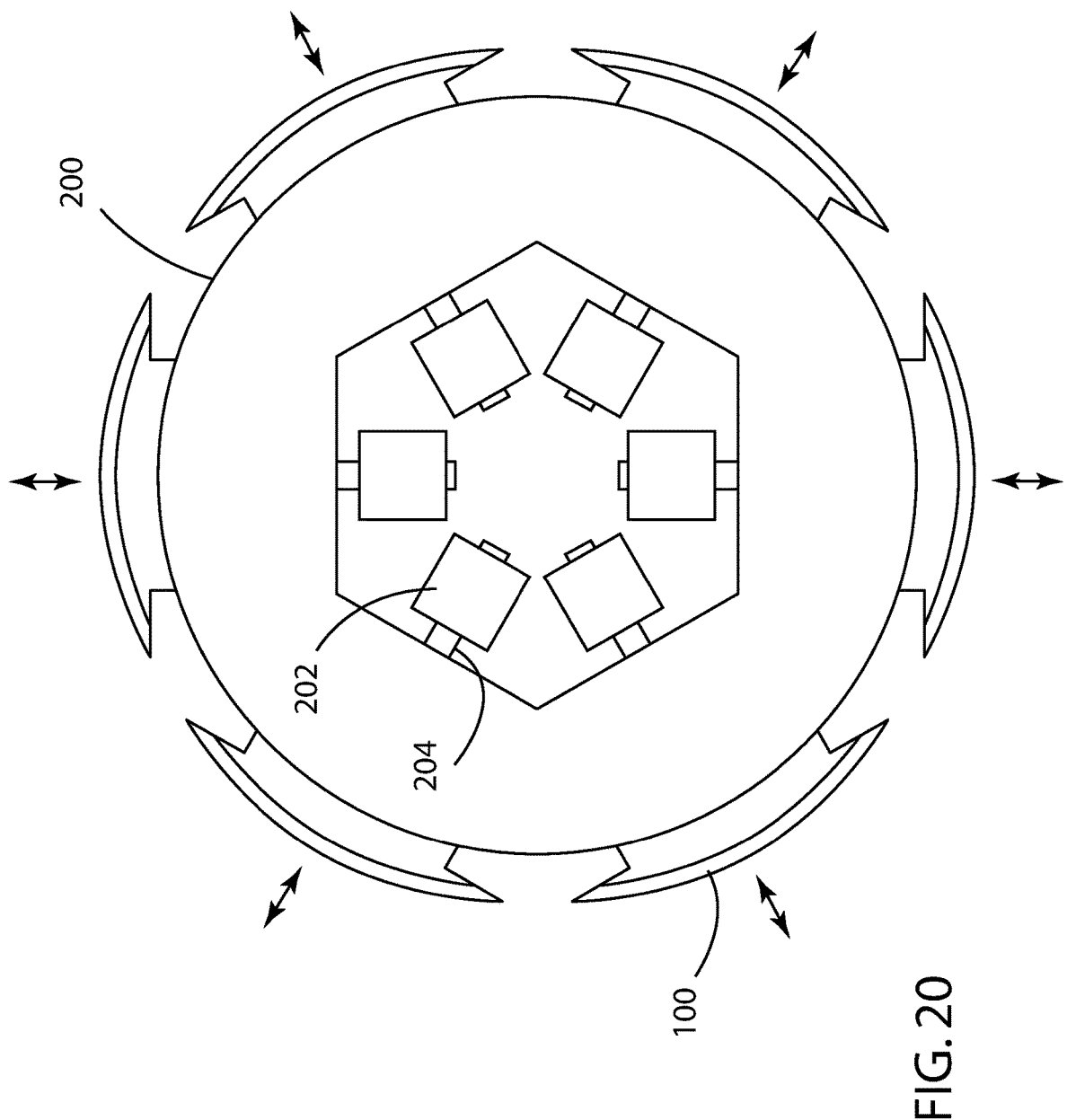
FIG. 20 illustrates a top view of the present embodiments according to another approach with six blades the hydraulic pistons in an extended position.
Figure 21:
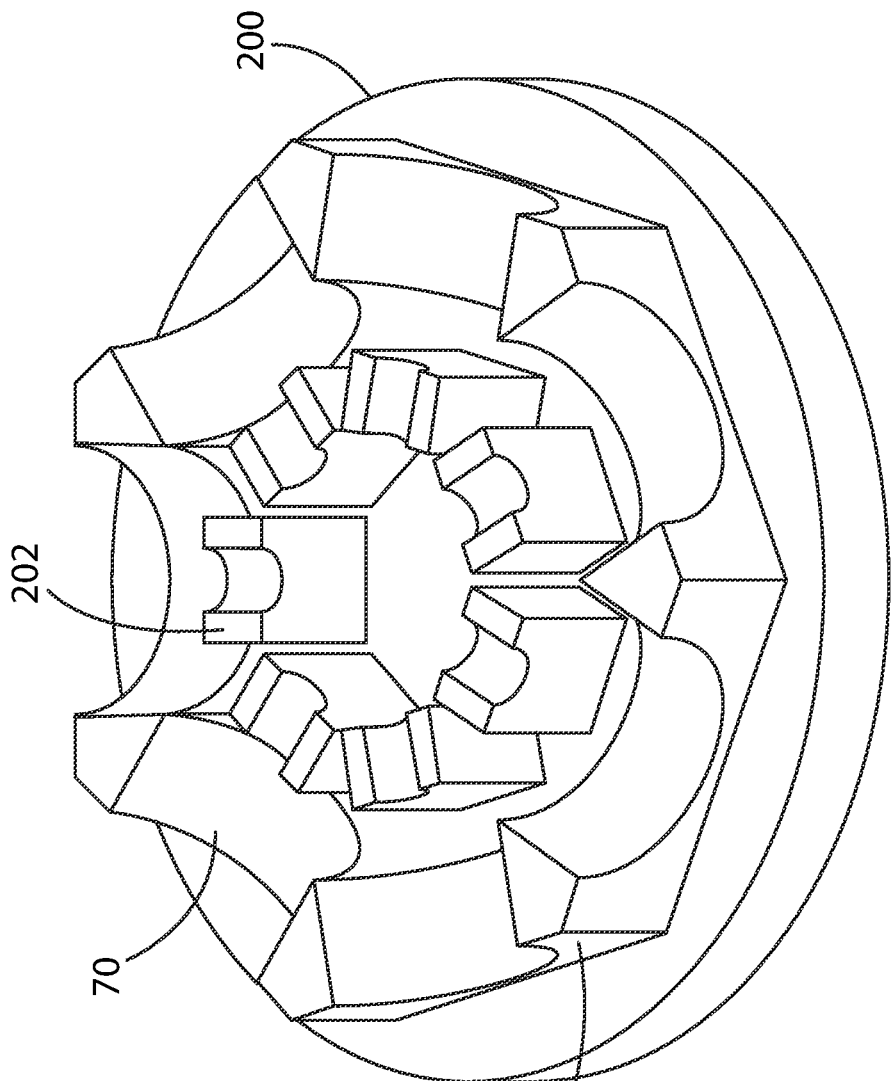
FIG. 21 illustrates a perspective view of a cutaway casing cavity showing the bottom half of the casing of the present embodiments according to FIG. 20.
Figure 22:
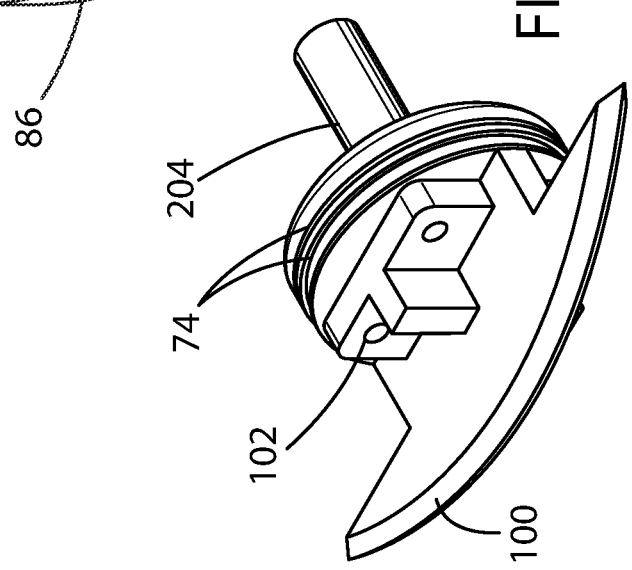
FIG. 22 illustrates a perspective view of a piston/blade assembly of the present embodiments according to FIG. 20.
Figure 24:
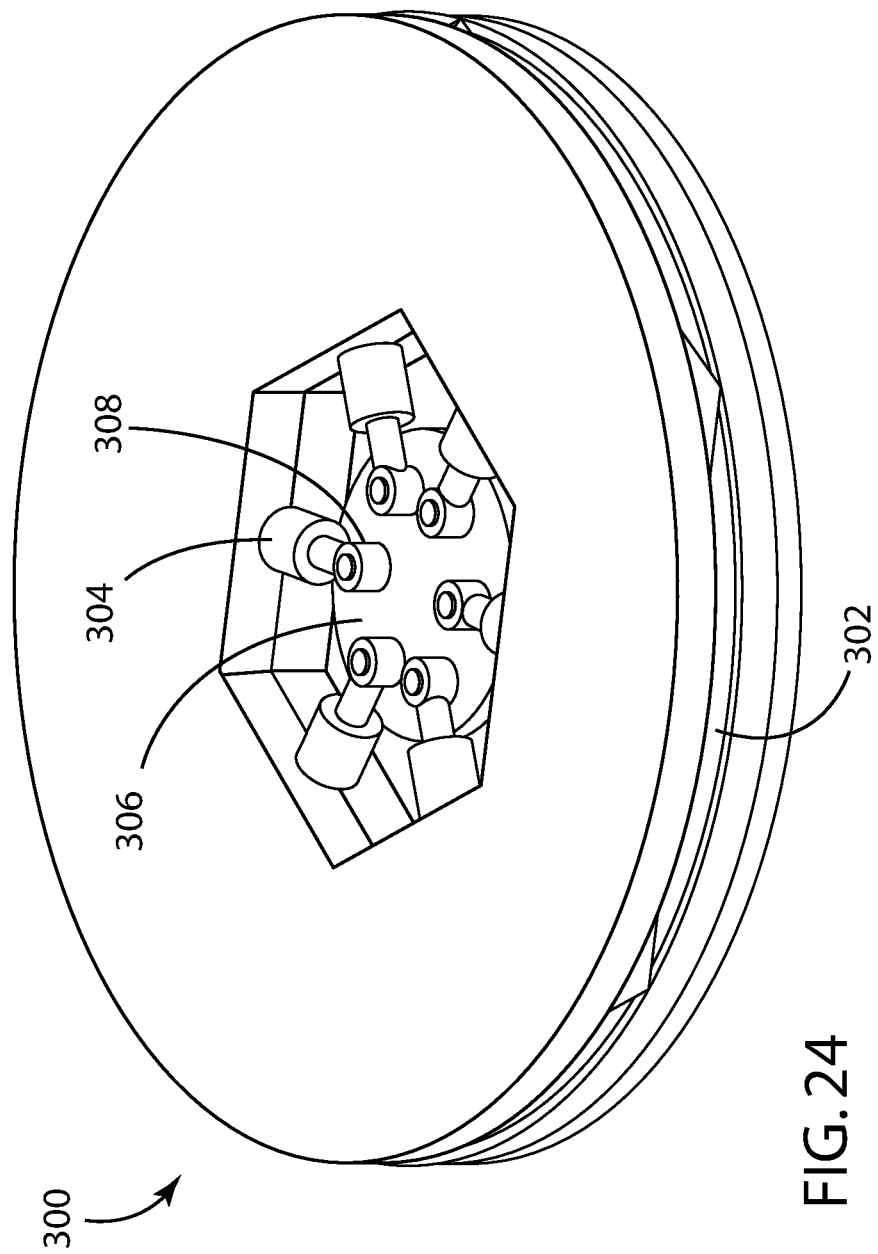
FIG. 24 illustrates a perspective view of the present embodiments according to another approach with six arched blades attached to 6 individual hydraulic pistons in a retracted position.
Figure 25:
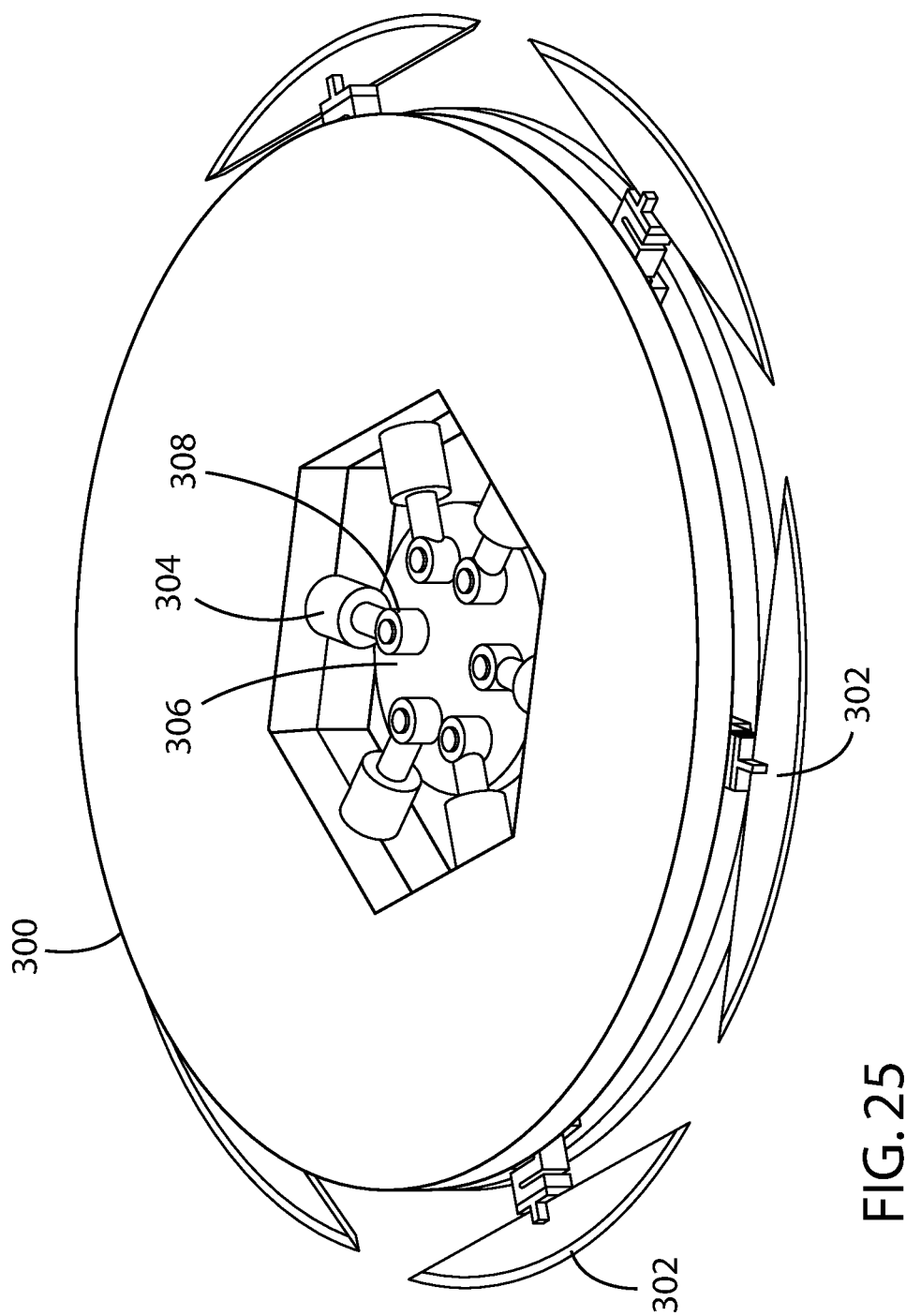
FIG. 25 illustrates a perspective view of the present embodiments according to FIG. 25 with six arched blades attached to 6 individual hydraulic pistons in an extended position.
Figure 26:
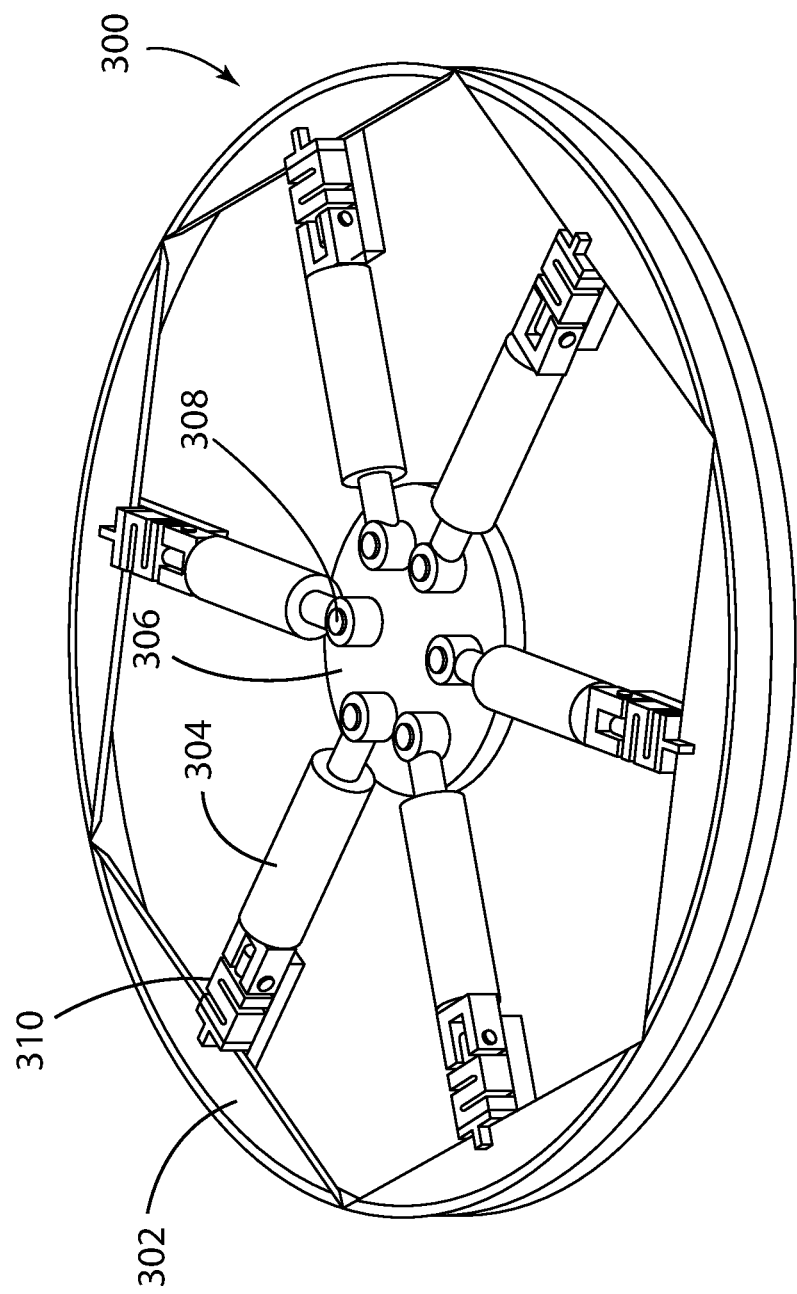
FIG. 26 illustrates a cutaway top view of the present embodiments according to FIG. 24 with the hydraulic pistons exposed in a retracted position.
Figure 27:
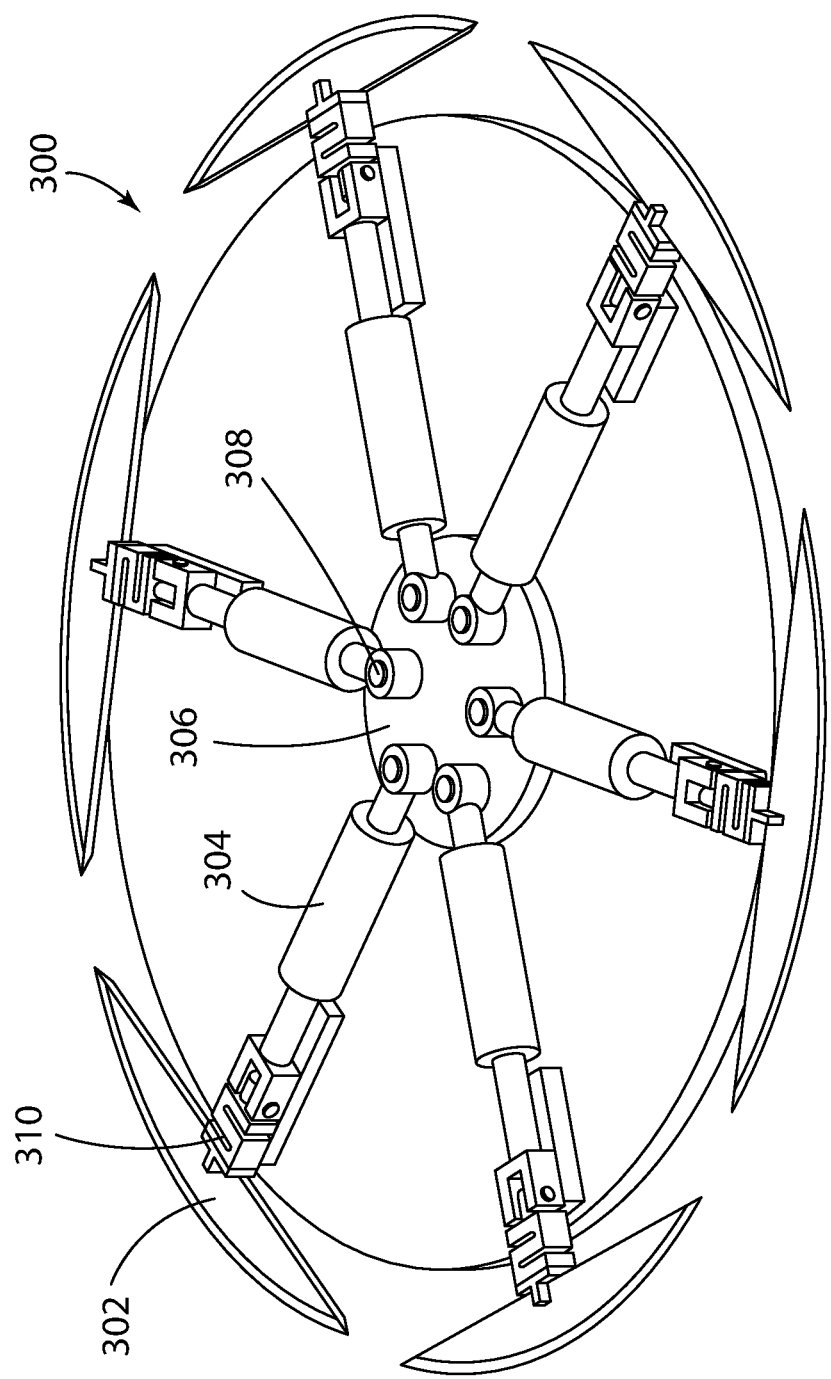
FIG. 27 illustrates a cutaway top view of the present embodiments according to FIG. 24 with the hydraulic pistons exposed in an extended position.

FIGS. 2 and 3 illustrate an exploded and assembled perspective view of an exemplary approach to the present embodiments, which have component parts shown in more detail in FIGS. 4-15. Cutting head 40 may have at least one housing O-ring and channel to withstand up to about 10,000 PSI 46; cutter step to allow overlap in retracted position 48 (See FIGS. 4 and 8-9); a top plate 50; a main casing 52; openings 54 for bolts 56 to clamp top plate 55 to casing 52; threaded holes 55 to received bolts 56; bolts or other connectors to clamp top plate onto the casing 56, again configured to withstand up to about 10,000 PSI; a casing cavity to receive hydraulic fluid 58 under pressure up to about 10,000 PSI; blade 60 hardened steel or other material to cut through at least a 1 inch thick metal plate and otherwise withstand the force from the piston without deforming or otherwise damaging the blade edge; rounded edge 61 in lieu of a blade (see FIG. 16B) to crimp or deform the pile, such as to hold a pipe within a pipe; piston head 62 as part of an exemplary; piston/cutter assembly 63; an optional piston cutter plate 64 used for extensions or to otherwise set the final stroke distance of the piston; a cuter mounting bracket 66; bolts to mount cutter onto cylinder 68, again sized and shaped to maintain the integrity of the housing cavity under pressure; a cylinder wall 70; hydraulic fluid 72; cylinder seals 74; a rear plate for cylinder acts as a stop 76; piston cutter bracket 78; fixed seal 80 within cylinder wall 70; second hydraulic line 82/83 from hose 1068, which is a conduit through top plate and casing for hydraulic fluid to push back pistons to retracted position; O-rings 85; stop for retracted cutter 86; opening 88 in top plate 50 to mount hydraulic hose 90; hydraulic hose 90; cylinder wall 92 mate to top plate 50.

FIG. 16A illustrates a perspective view of an exemplary cutter edge bracket 102 of the present embodiments according to another approach with an arched blade 100.

FIG. 16B illustrates a perspective view of an exemplary cutter bracket 102 of the present embodiments according to another approach with a rounded edge 61 to allow crimping.

FIGS. 17-22 he arched edge embodiment with alternate features to guide the piston through the cylinder wall. In this alternate configuration, a piston may have a shaft guided within the casing cavity 200; guide blocks 202 (upper and lower, which can be connected by, for example, bolts) to guide internal piston shaft 204. FIGS. 23A-E illustrate top views of the present embodiments according to another approach with two blades the hydraulic pistons in an extended position.

FIG. 24-27 illustrate a perspective view of the present embodiments according to another approach with six arched blades attached to up to 6 individual hydraulic pistons 304. As shown, these embodiments 300 may have cutters 302; hydraulic cylinders 304; a plate to mount hydraulic cylinders 306; a mount of plate to hydraulic cylinders 308; and an optional pressure sensor 310

Figure 28:
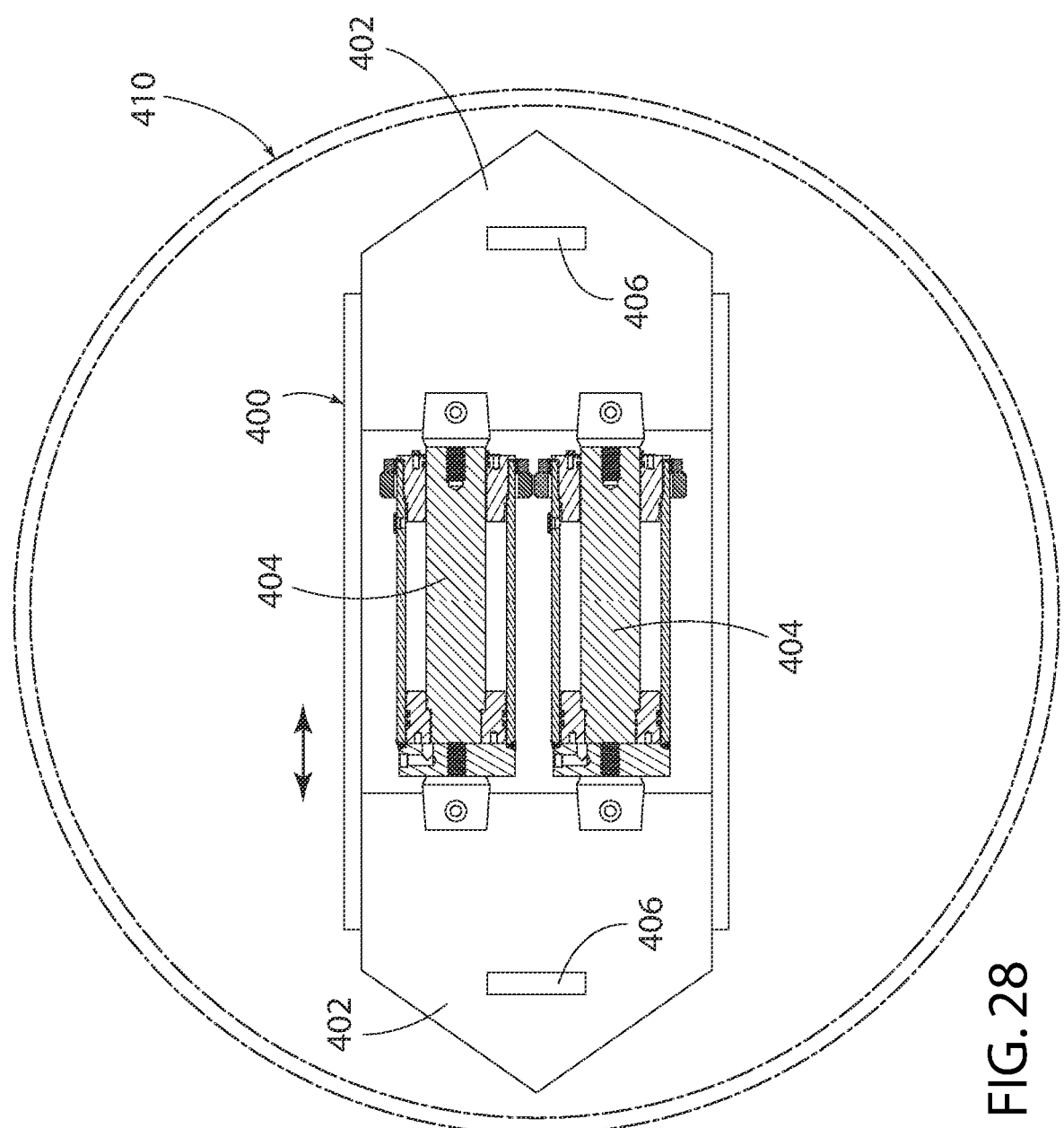
FIG. 28 illustrates a top view of the present embodiments according to another approach with two opposed blades attached to a pair of hydraulic pistons in a retracted position.
Figure 29:
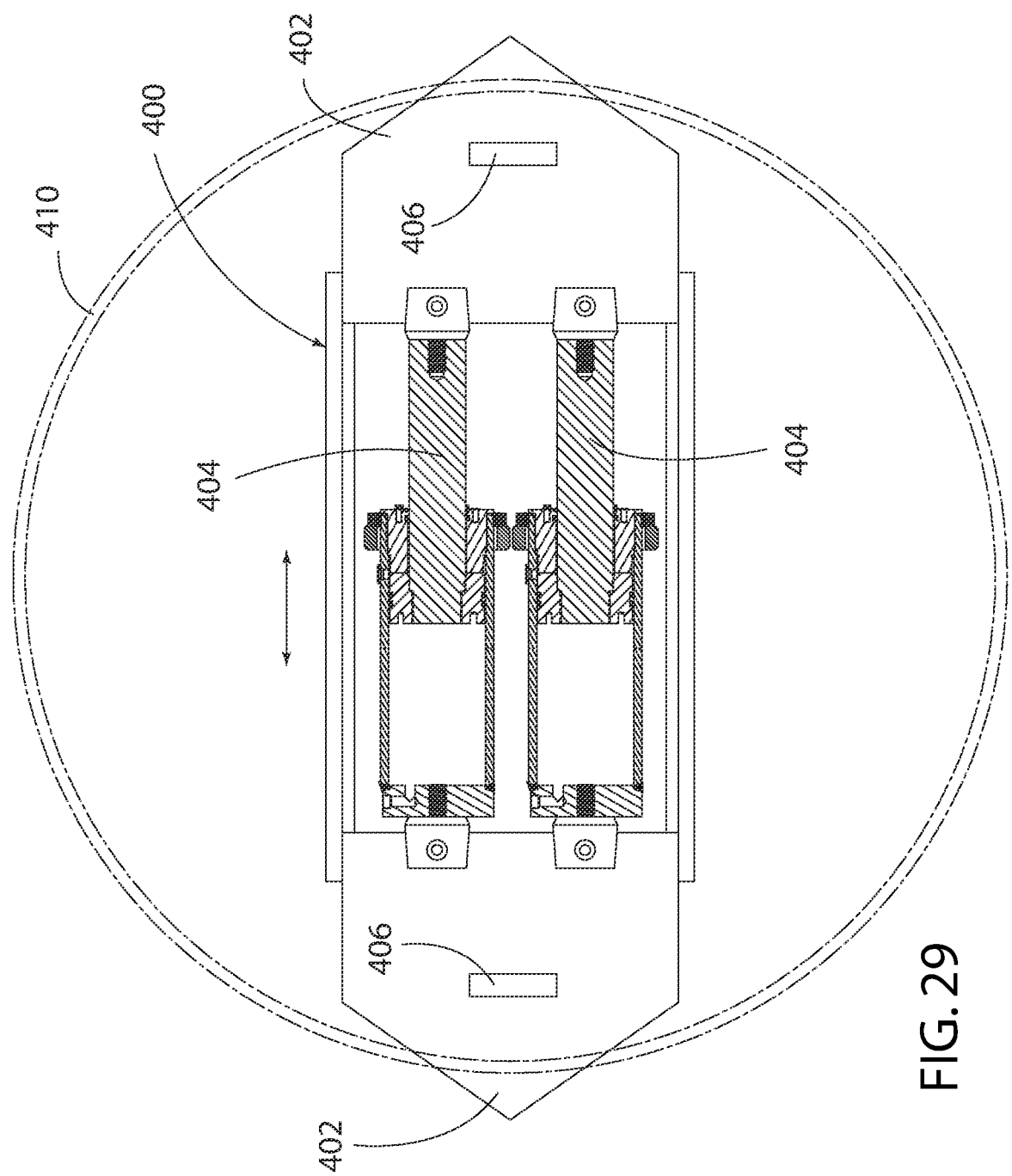
FIG. 29 illustrates a top view of the present embodiments according to FIG. 28 with two opposed blades attached to a pair of hydraulic pistons in an extended position.
Figure 30:
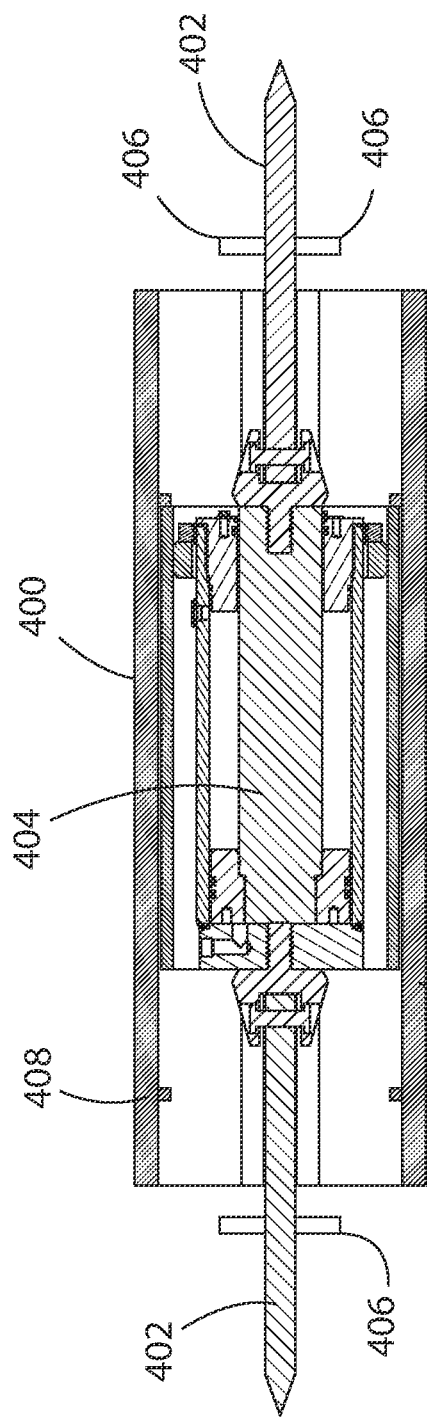
FIG. 30 illustrates a top view of the present embodiments according to FIG. 28 with two opposed blades attached to a pair of hydraulic pistons in a retracted position.
Figure 31:
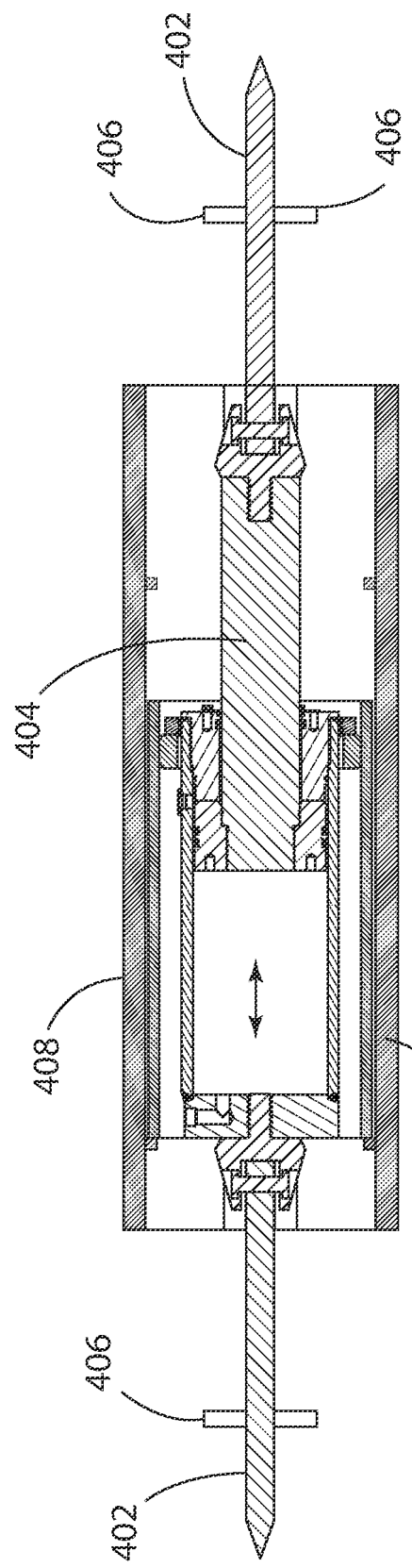
FIG. 31 illustrates a side view of the present embodiments according to FIG. 28 with two opposed blades attached to a pair of hydraulic pistons in an extended position.

FIGS. 28-31 illustrates a top view of the present embodiments according to another approach 400 with two opposed blades attached to a pair of hydraulic pistons, shown in a retracted position in FIG. 28 with multiple hydraulic cylinders 404 connected to each blade 402. As shown, these embodiments can have a cutter 402, a hydraulic cylinder 404, a stop 406, housing plates 408 to cut a pipe 410.

Figure 32:
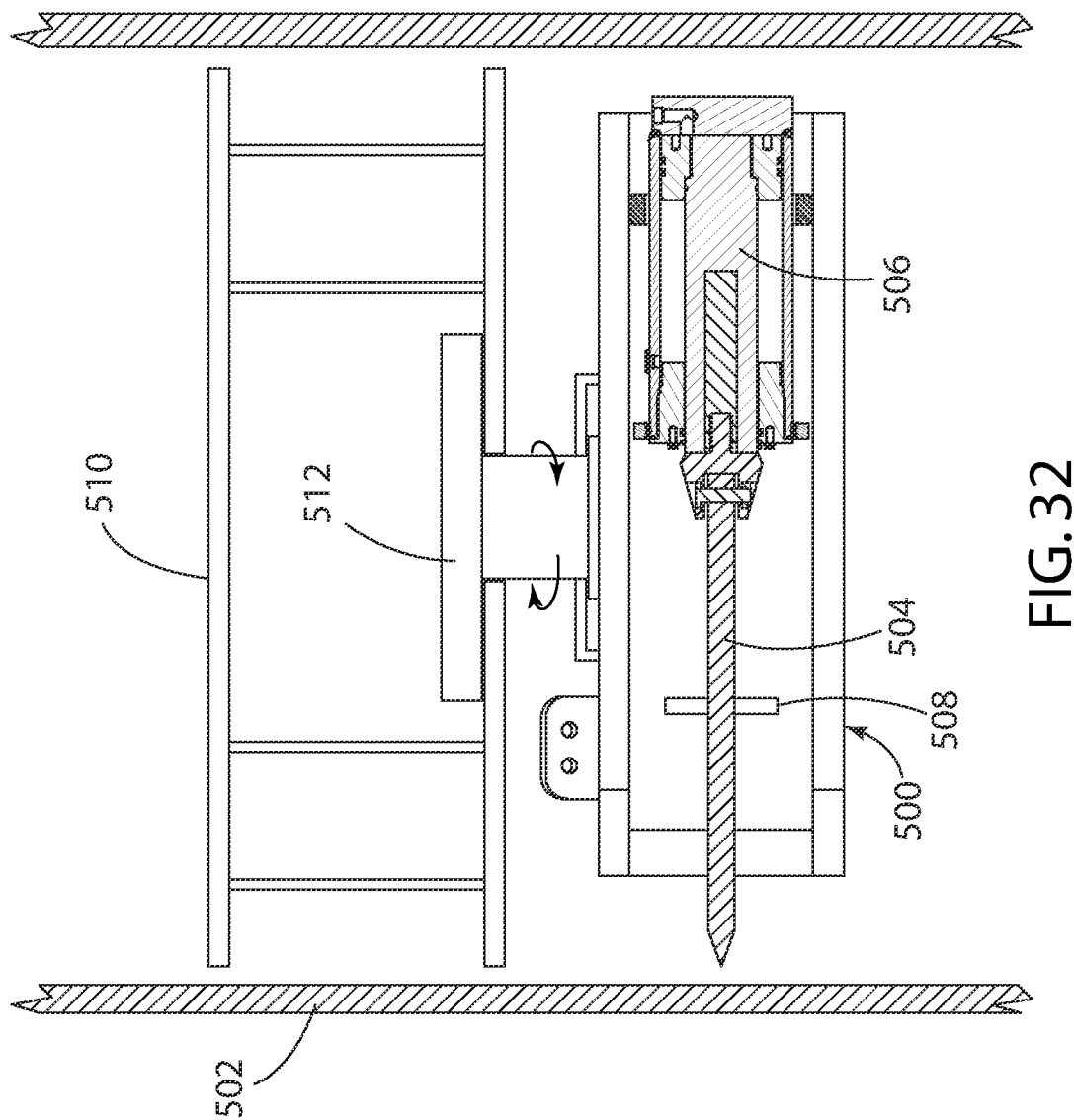
FIG. 32 illustrates a side view of the present embodiments according to another approach with a single rotatable blade and hydraulic pistons in a retracted position.

FIG. 32 illustrates a side view of the present embodiments according to another approach with a single rotatable blade and hydraulic pistons in a retracted position. As shown, this embodiment 500 can have be used to cut a pipe 502 with a cutter 504 using a hydraulic cylinder 506, a stop 508, a mounting platform 510 on a rotatable mount 512. In this embodiment a pipe can be cut in multiple steps of make one cut, rotating the piston/cutter assembly, making another cut, and so on until the entire circumference of the pipe has been cut.

Figure 33:
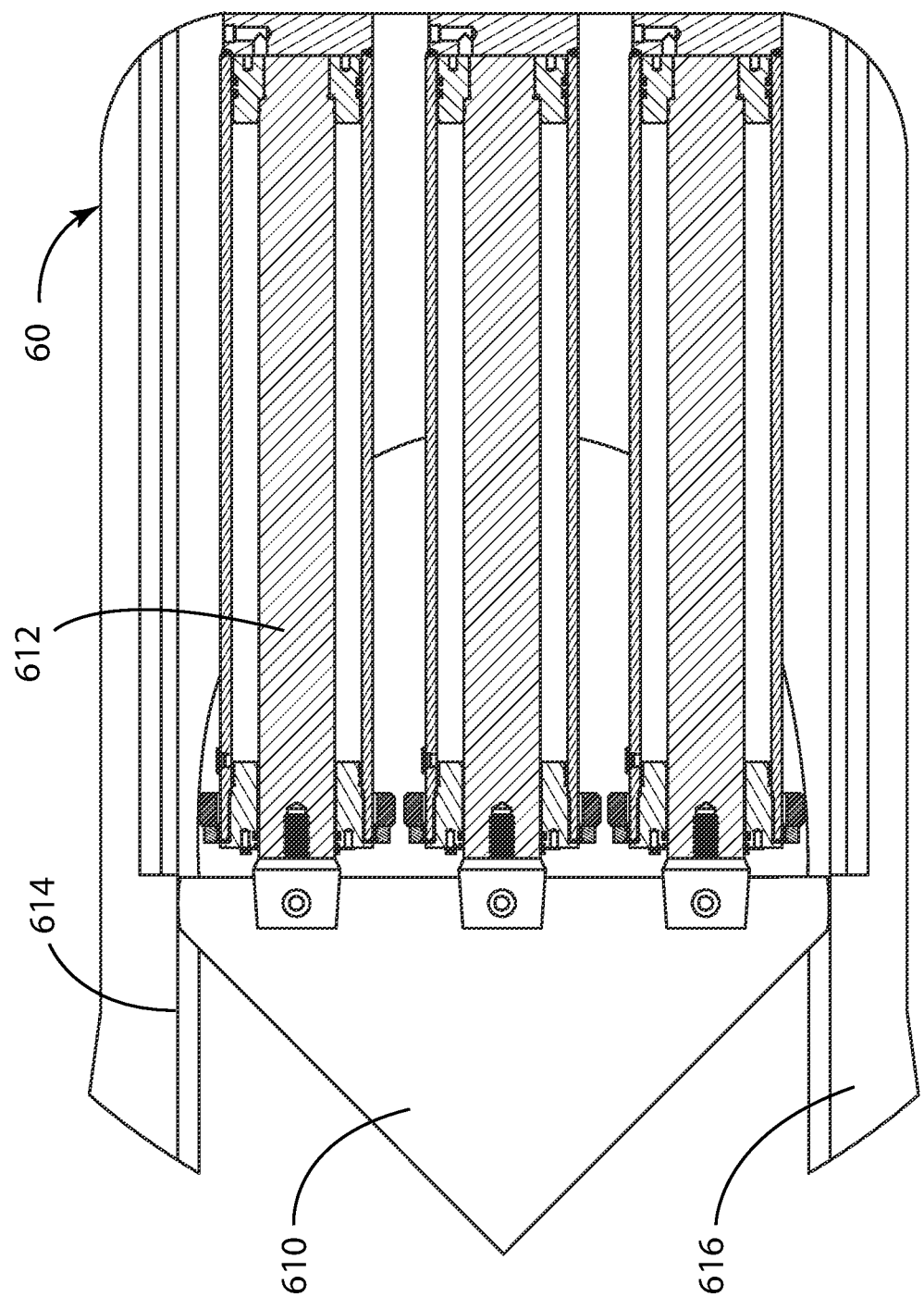
FIG. 33 illustrates a top view of the present embodiments according to another approach with a single blade attached to three hydraulic pistons in a retracted position.
Figure 34:
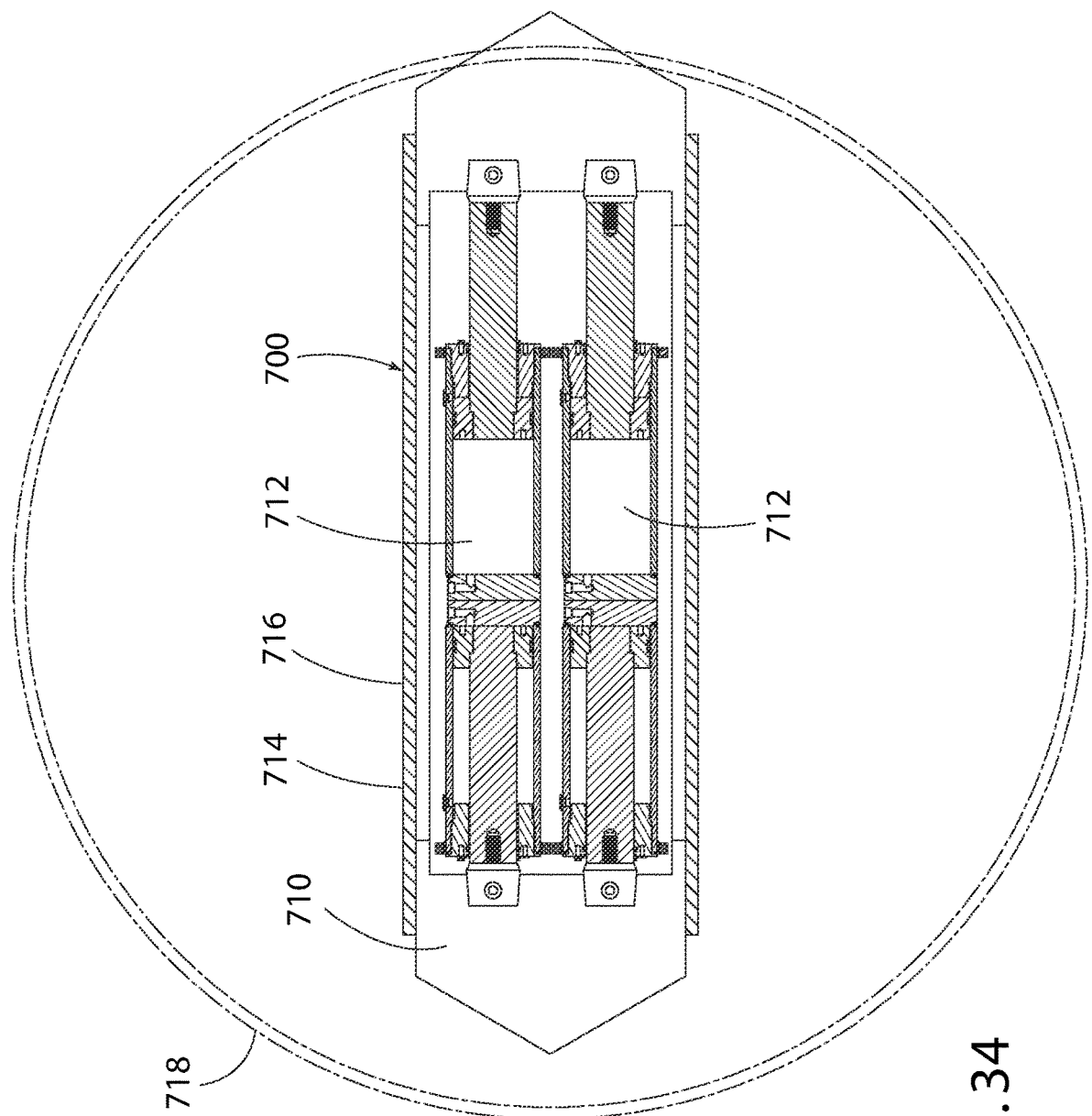
FIG. 34 illustrates a top view of the present embodiments according to another approach with two opposed blades attached to a pair of hydraulic pistons in a partially extended position.

FIG. 33 illustrates a top view of the present embodiments according to another approach with a single blade attached to three hydraulic pistons in a retracted position. In this embodiment 600, multiple hydraulic cylinders per blade 610 can be used connected to hydraulic cylinders 612 moved along a track for cutter 614 disposed within a frame 616 to hold cylinders and cutter. FIG. 34 illustrates a top view of the present embodiments according to another approach with two opposed blades attached to a pair of hydraulic pistons in a partially extended position. In this embodiment, multiple hydraulic cylinders per opposing blade pair 700 can have a cutter blade 710, hydraulic cylinders 712, track for cutter 714, and frame to hold cylinders and cutter 716 to cut pipe 718.

Figure 35:
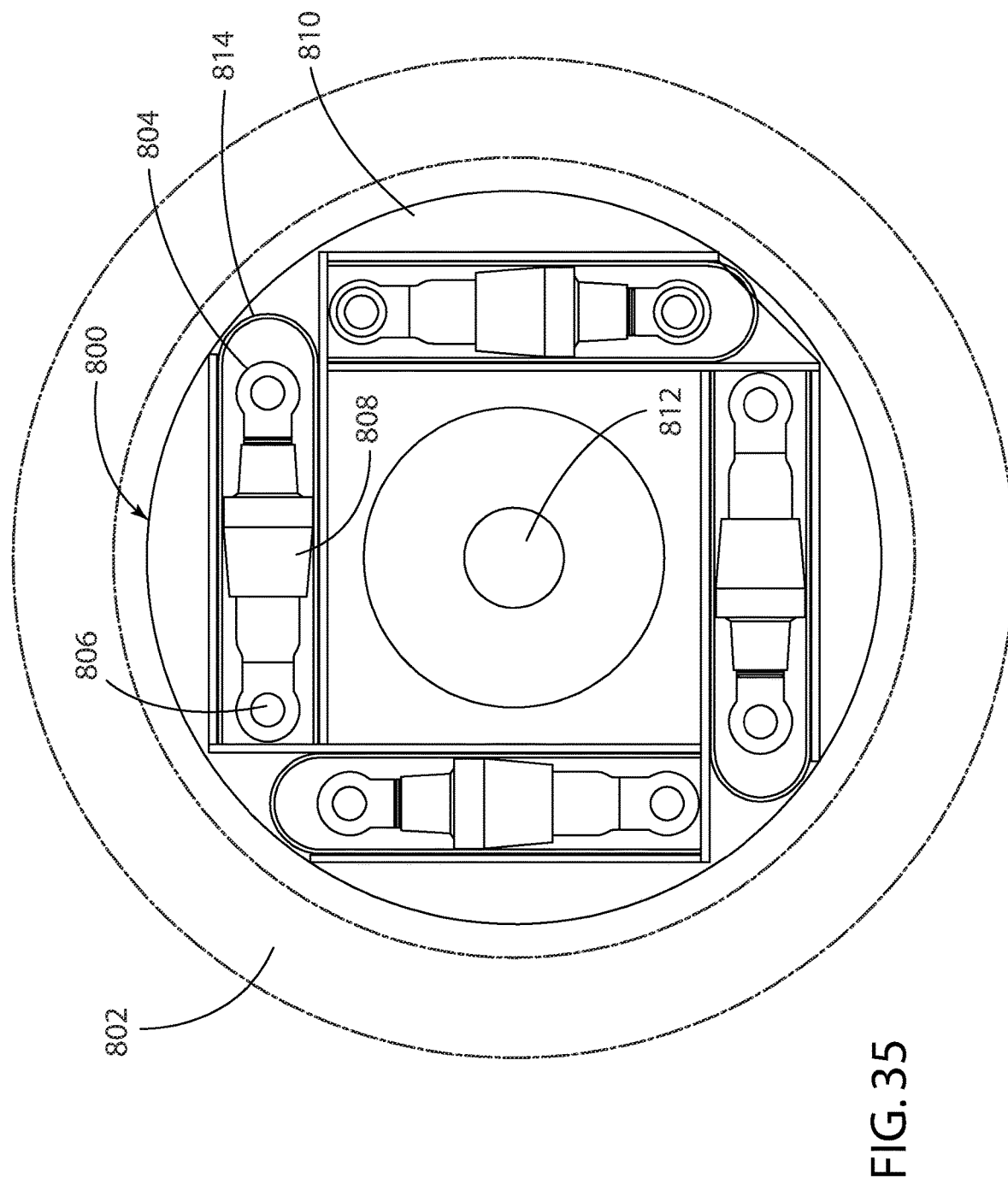
FIG. 35 illustrates a top view of an optional clamping and/or rotating assembly of the present embodiments in a retracted position.

FIG. 35 illustrates a top view of an optional clamping and/or rotating assembly of the present embodiments in a retracted position.

Figure 36:
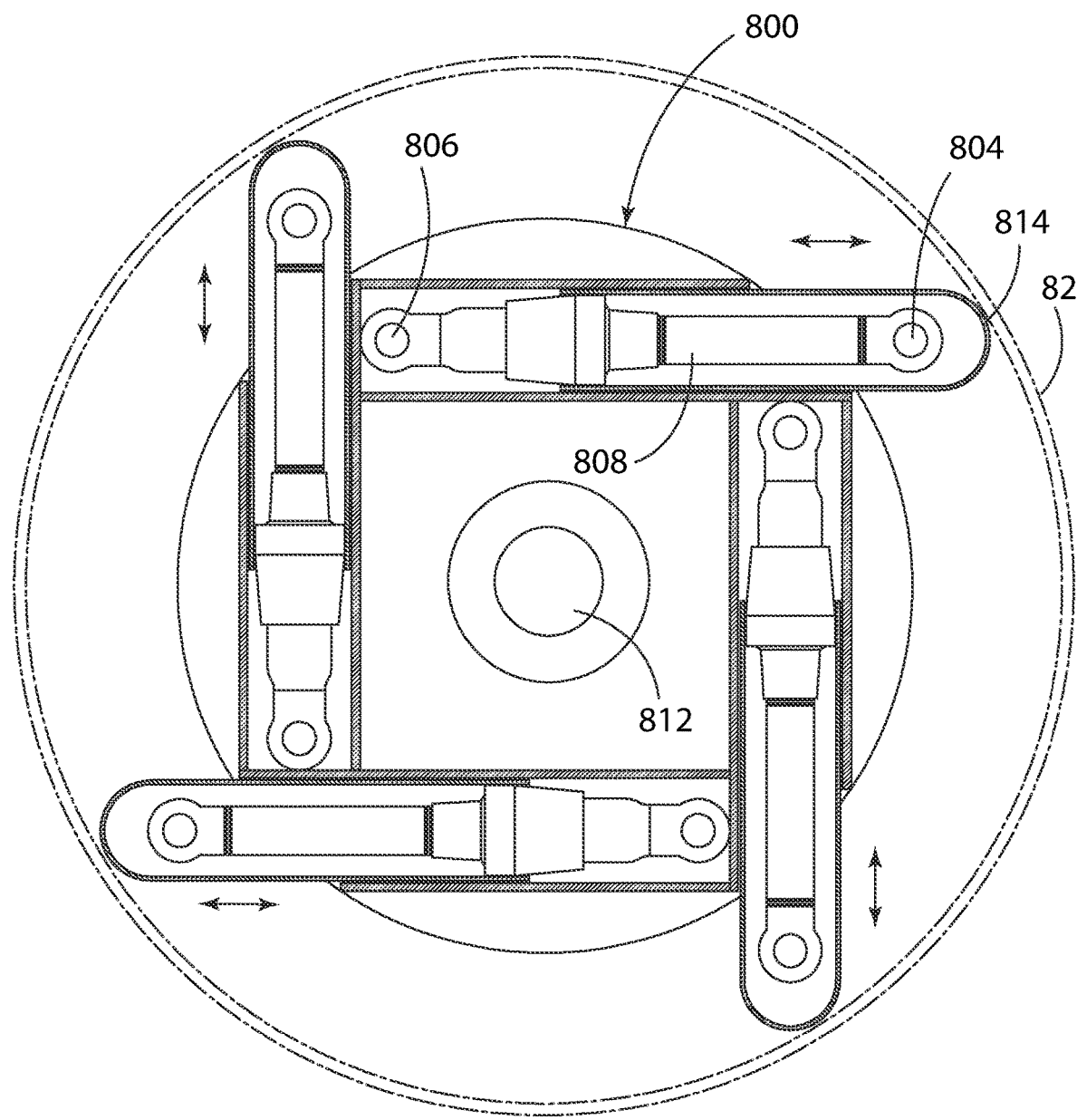
FIG. 36 illustrates a top view of an optional clamping and/or rotating assembly of FIG. 35 in an extended position.

FIG. 36 illustrates a top view of an optional clamping and/or rotating assembly of FIG. 35 in an extended position. This optional feature can be connected to the cutter assembly and used to hold the cutter assembly in place during a cut. This optional assembly can also be used to rotate the cutting assembly within the pipe when multiple cuts are desired. As shown in this embodiment, optional internal clamp 800 can to hold and/or rotate the cutter within pipe 802 using a hydraulic piston 808 mounted to clamp piston 808 end 804 to base plate 810 using mount 806. Clamp end 814 can be extended by the piston to engage the interior wall of pipe 802.

FIG. 37-58 show an embodiment having the blades extending beyond the diameter of the housing, even in its retracted position. In these embodiments the pressurized hydraulic fluid supply can be in a range up to 20,000 PSI (pounds per square inch), preferably in the range of about 4,000 to 12,000 PSI, and most preferably about 6,000 PSI. In use, a user will use a powerpack that can generate 6,000-8,000 PSI. For example, the housing is 36 inches, whereby it is sized to cut a 42 inch diameter pipe with a 1 inch thickness (OD 42", ID 40"). In these embodiments the piston may have a stroke of up to 5.5 inches. In another embodiment, a 32 inch housing may be used for a 36 inch diameter pipe. The piston/blade assembly has a stop in a retainer flange ring to limit extending beyond a predetermined stroke.

The blade may have a rounded edge to crimp rather than cutting through a pipe surface, but a piercing point is preferred.

Figure 37:
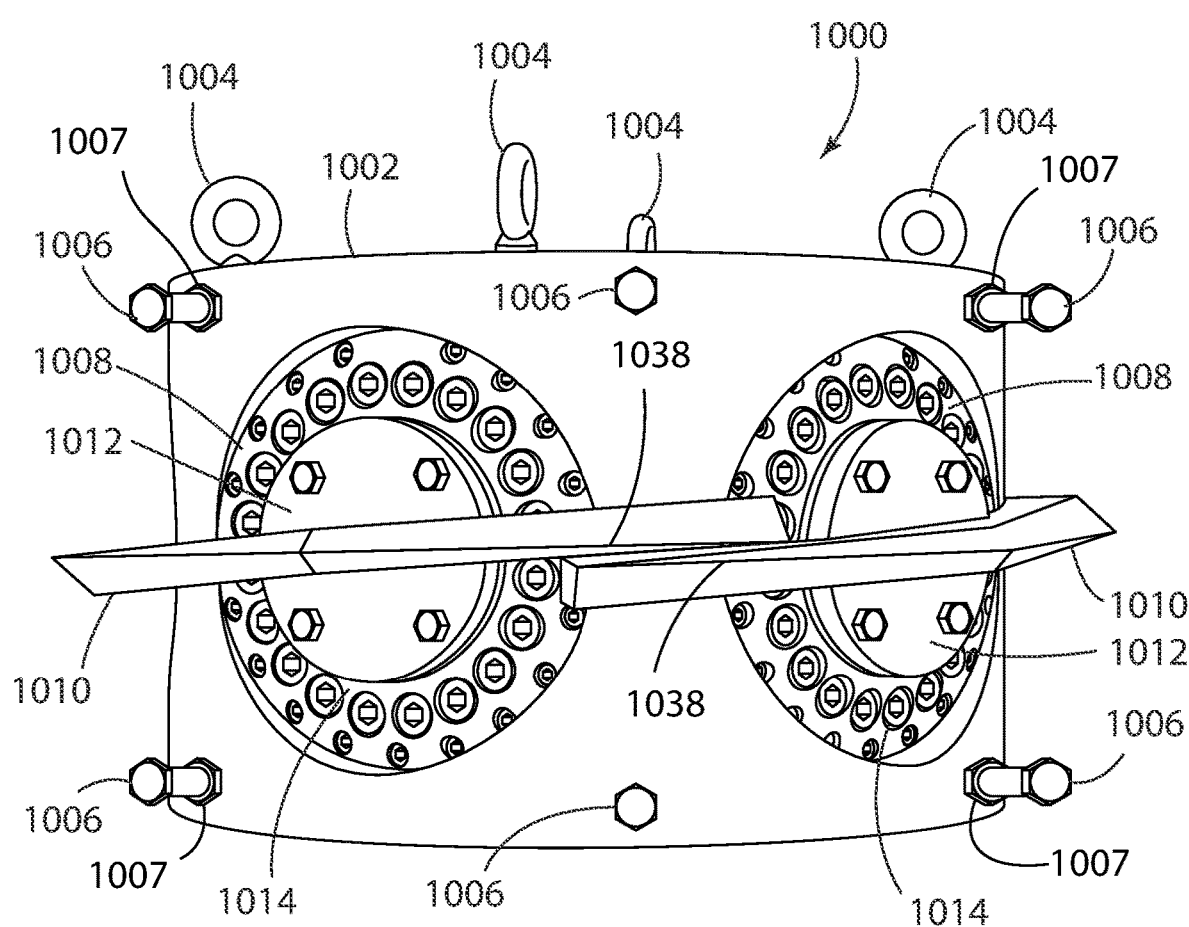
FIG. 37 illustrates a side view of the present embodiments according to another approach with the hydraulic pistons in a retracted position and the blades in a circular overlay.

FIG. 37 illustrates a side view of the present embodiments according to one approach showing the hydraulic pistons in a retracted position and the blades in a circular overlapping array, and which has component parts shown in more detail in FIGS. 40-52. Cutting head 1000 as shown has a main casing housing 10002 designed to withstand up to about 10,000 PSI. As shown, cutting head 1000 can have eye hooks 1004 on top to attach to a crane to lower the cutter into a pile. As shown here, housing 1002 can be a solid milled block of metal eliminating the need for a top plate 50 as shown in the embodiment of FIG. 2. The top of housing 1002 also allows access for conduit 83 to receive hydraulic fluid to push blade 1010 to a retracted position and conduit in a similar fashion as described herein as well as access to conduit 1036 to receive hydraulic fluid to extend the blades into the pile.

Housing 1002 may also have spacers/bolts 1006 which radiate from the housing at a distance beyond a blade cutting surface in its retracted position. Spacers 1006 shown can be threaded rod with a locking nut 1007 to allow adjustment. This spacer feature protects blades 1010 while the cutting head is lowered and retrieved and also to stabilize/guide the cutting head while it is in use extending and retracting blades 1010. When spacers 1006 are set they must extend to a diameter no greater than the interior diameter of the pile 1016 to be cut while extending beyond the furthest exposed cutting surface of blade 1010. Preferably spacers 1006 are configured to be flush with the diameter of the furthest tip to the blade. In other words, the diameter of the cutting head's retracted blades is the same as the diameter of the spacers 1006. It is noted though that this diameter may vary by up to a 1 inch variation and still be within the scope of the present embodiments. Spacer clearance settings would vary based on the application, but optimally the position of the spacers would be positioned to not only protect the blade, but also allow the blade enough travel to not only reach the pile, but also to allow the blades to cut through the pile along an entire circumference of the pile. Preferably, the difference of the outer diameter of the cutting head and the inner diameter of the pile should be about ¼ to ½ of an inch of space.

Figure 52:
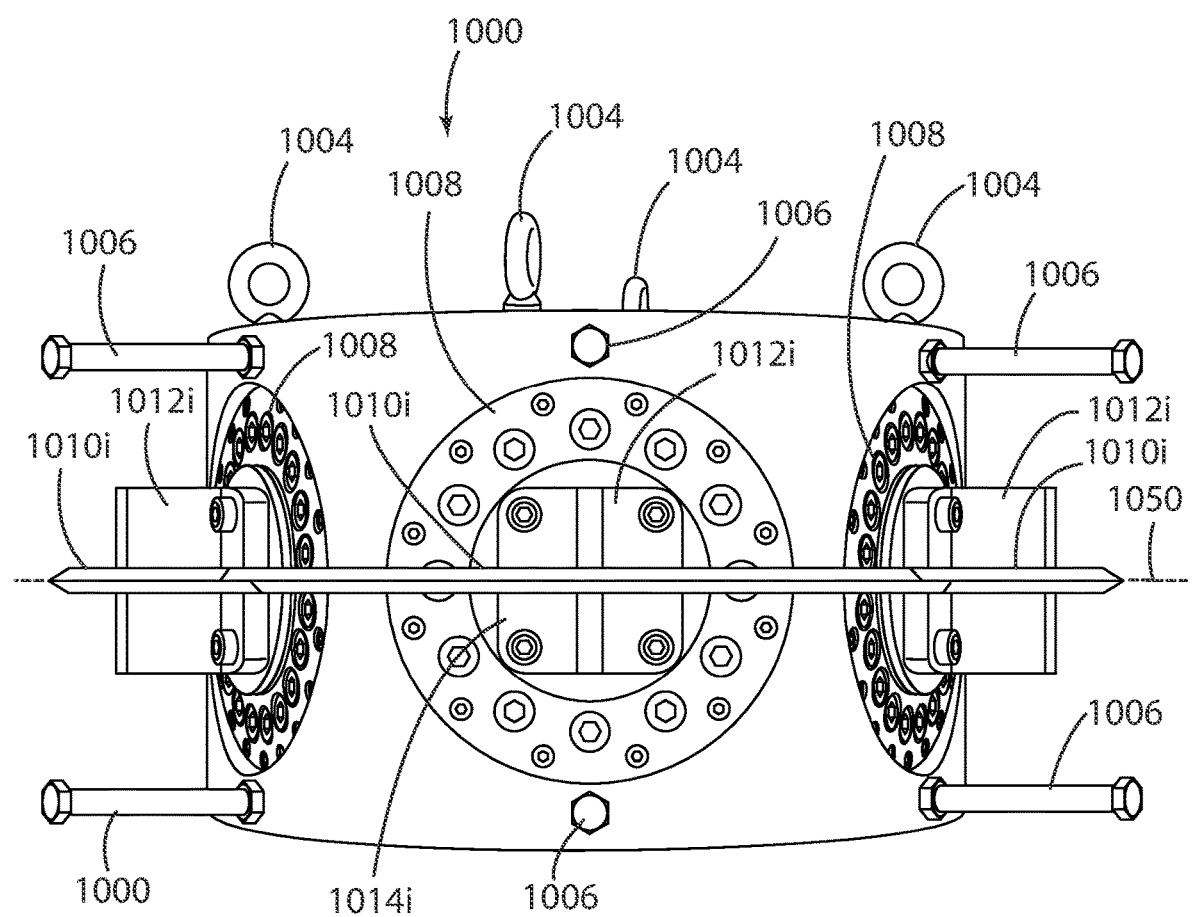
FIG. 52 illustrates a side view of the present embodiments according to another approach with the hydraulic pistons in a retracted position and with curved blades in a planar array with box-joint-like edges.
Figure 53:
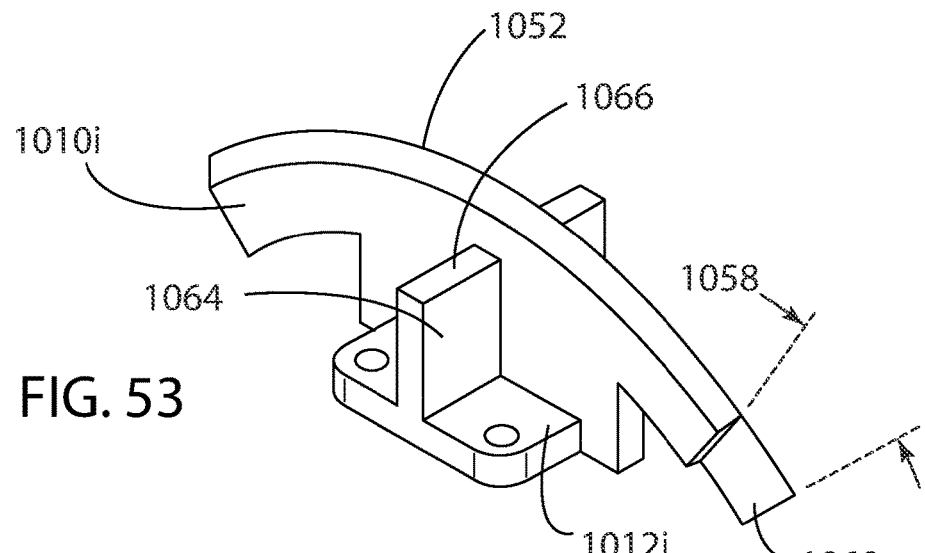
FIG. 53 illustrates a perspective view of a blade assembly of the embodiment of FIG. 52.
Figure 54:
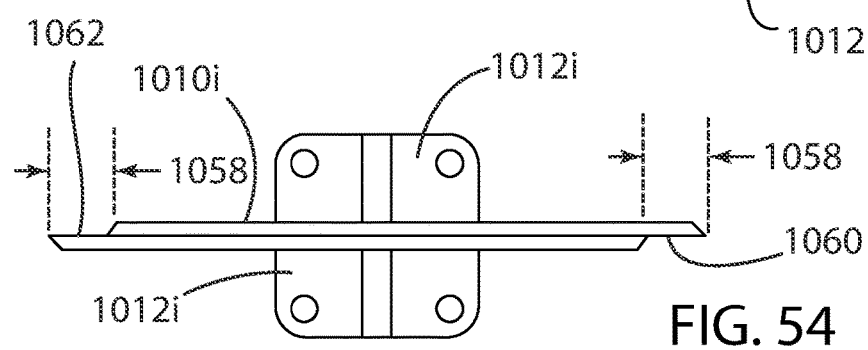
FIG. 54 illustrates a front view of a blade of the embodiment of FIG. 52.
Figure 55:
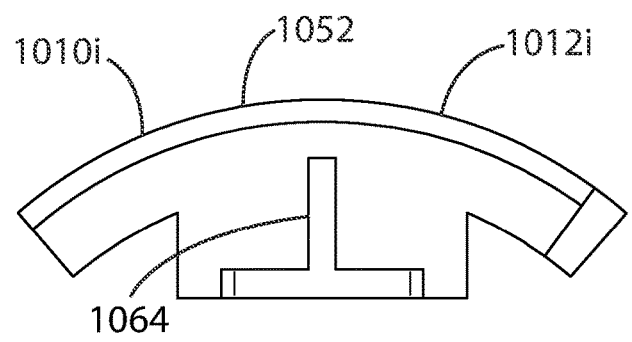
FIG. 55 illustrates a top view of a blade of the embodiment of FIG. 52.
Figure 56:
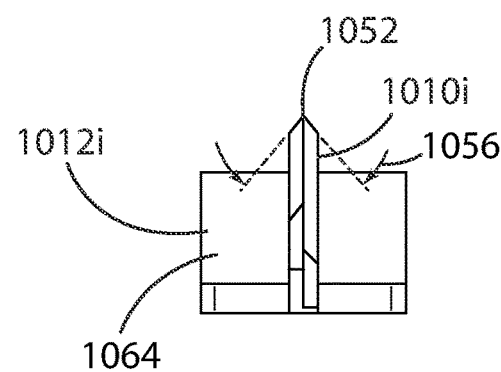
FIG. 56 illustrates a side view of a blade of the embodiment of FIG. 52.
Figure 59:
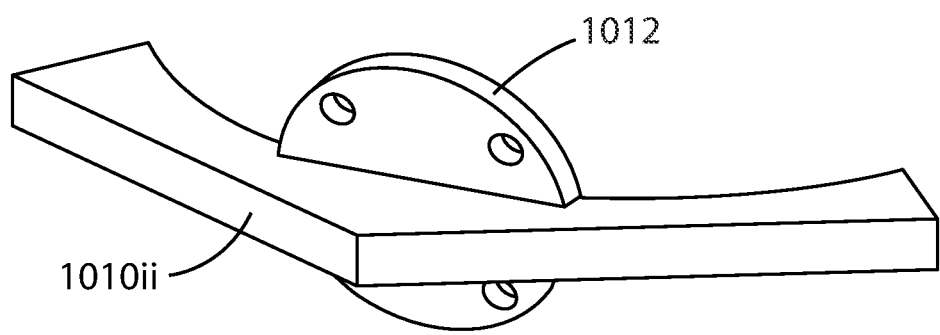
FIG. 59 illustrates a perspective view of an alternate blade assembly.
Figure 60:
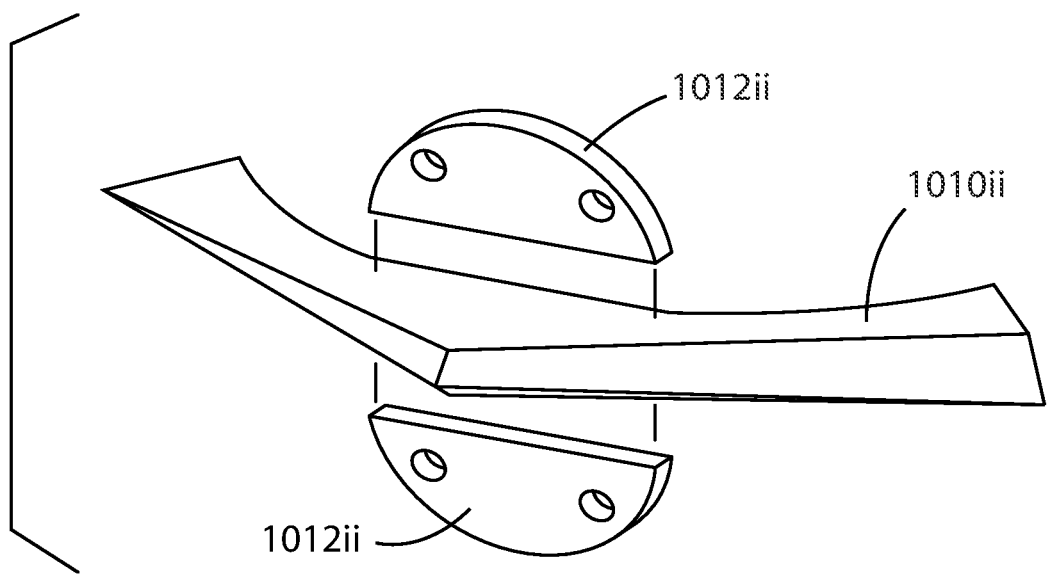
FIG. 60 illustrates an exploded perspective view of the alternate blade assembly of FIG. 59.

Other features of cutting head 1000 is a flange 1008 to hold piston assembly to main casing; a blade 1010 of FIG. 37 and an alternate blade 1010*i* of FIG. 52. Blades 1010 are held to the hydraulic piston by blade bracket 1012 of FIG. 37 or an alternate blade bracket 1012*i* of FIG. 52. Blades may also be custom configured to be integral with the pistons. Or in separate pieces such as shown in FIGS. 59-60 where blade configuration 1010*ii* is attached to two half-moon shaped brackets 1012*ii*, brackets 1012*ii* can be welded to bald 1010*ii* and thus blade 1010*ii* is directly in contact with the distal end of the piston 1020. Flange retainer ring 1008 is used as a stop to prevent the piston from extending further.

Figure 38:
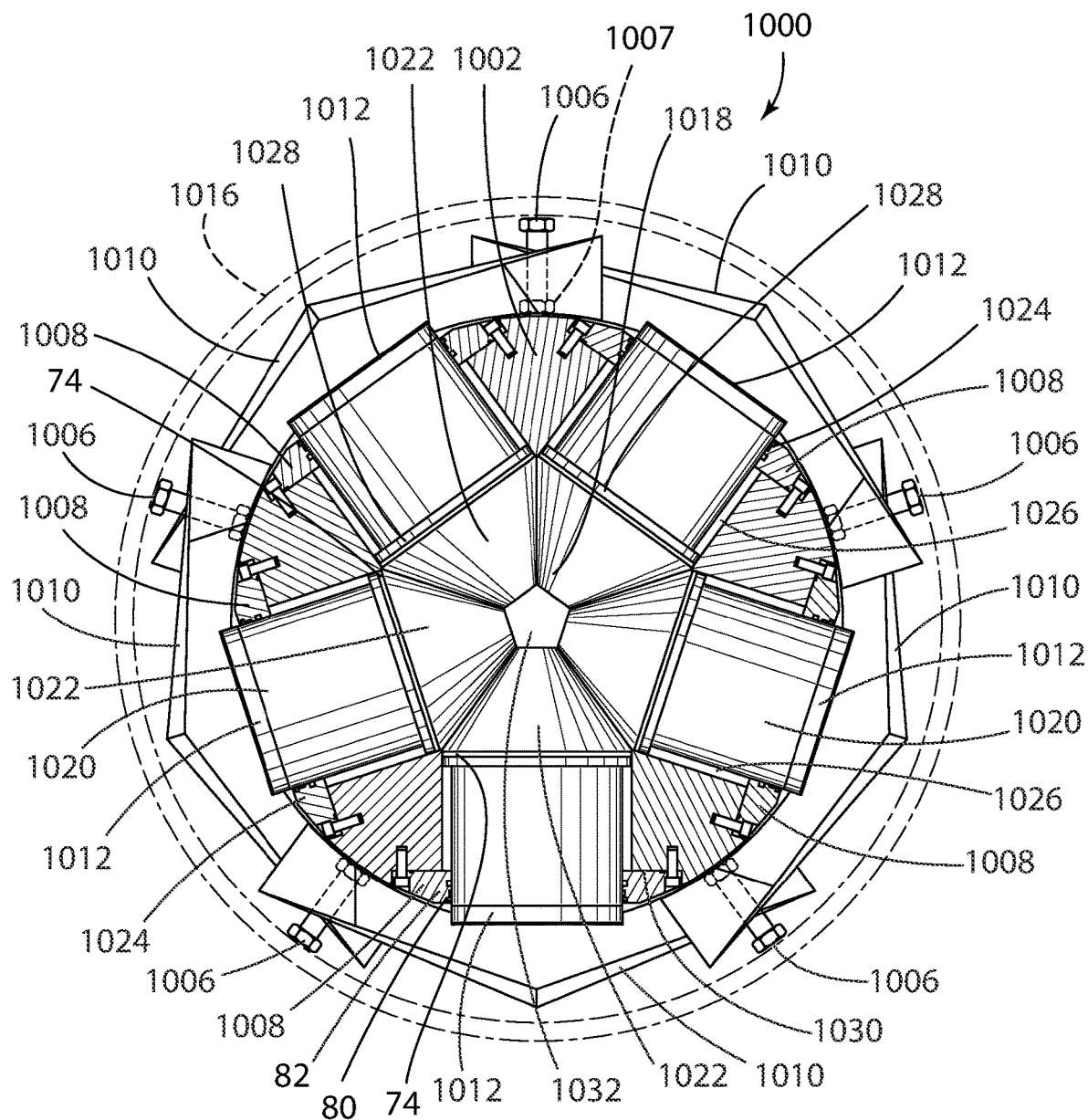
FIG. 38 illustrates a cutaway top view of the present embodiments according to FIG. 37 with the hydraulic pistons and blades exposed in a retracted position.
Figure 39:
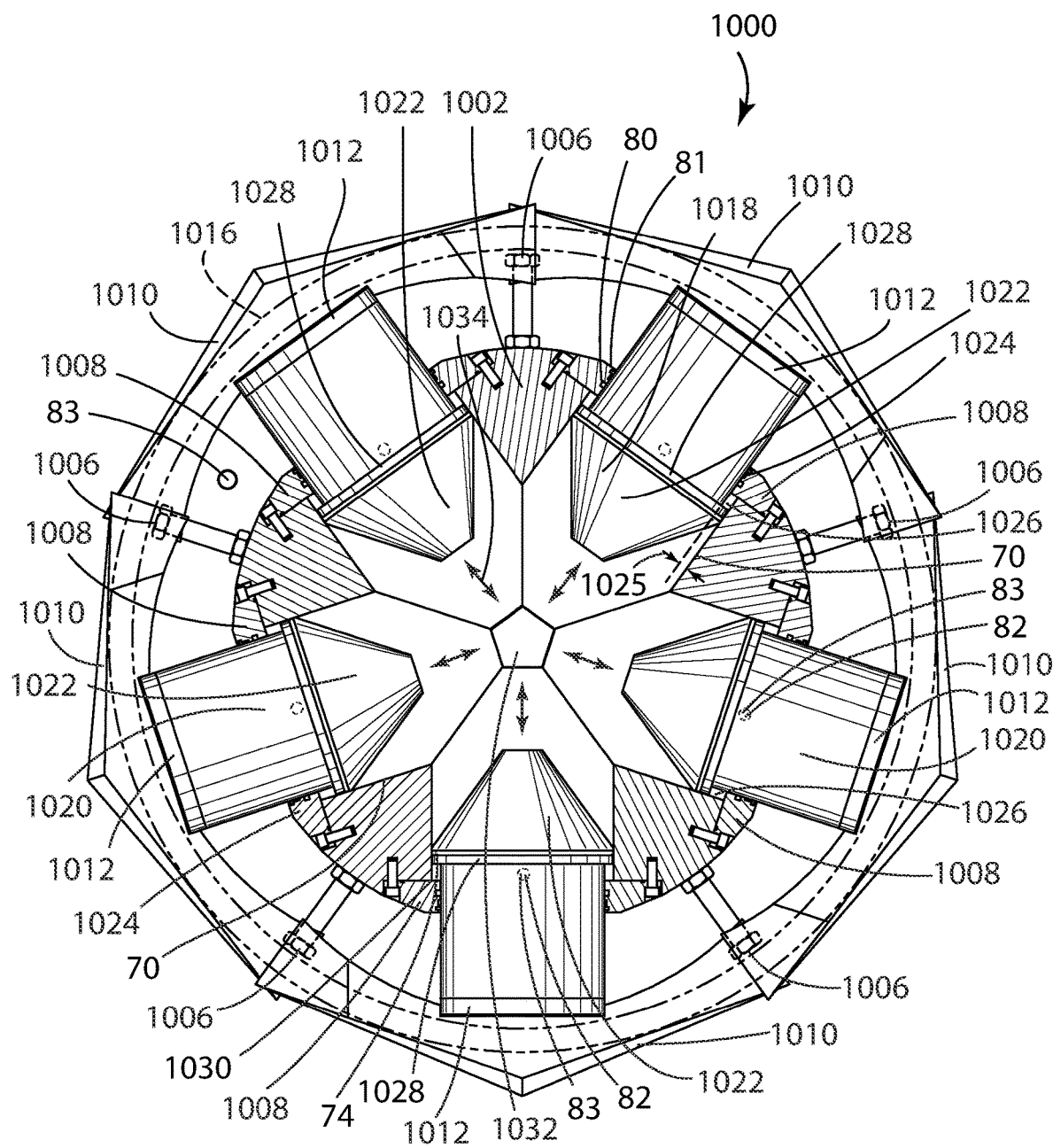
FIG. 39 illustrates a cutaway top view of the present embodiments according to FIG. 37 with the hydraulic pistons and blades exposed in an extended position.
Figure 40:
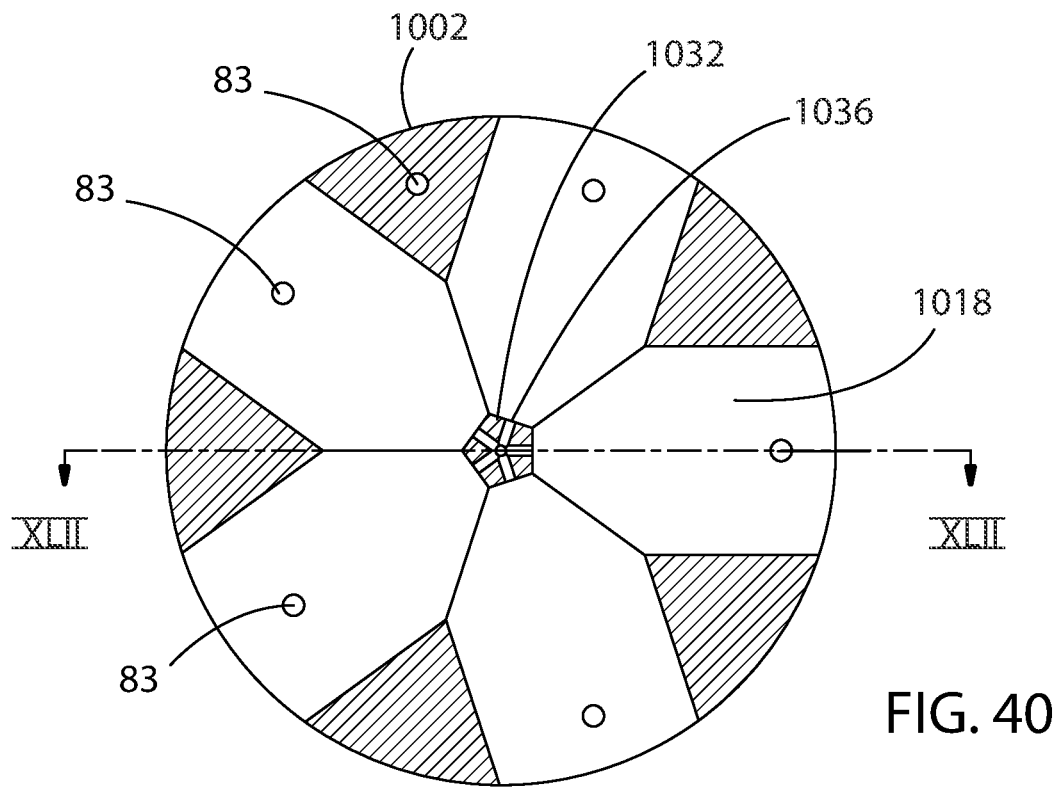
FIG. 40 illustrates a top cross-sectional view of a main casing of the embodiment of FIG. 37 taken along section lines of XLI-XLI of FIG. 41.
Figure 50:
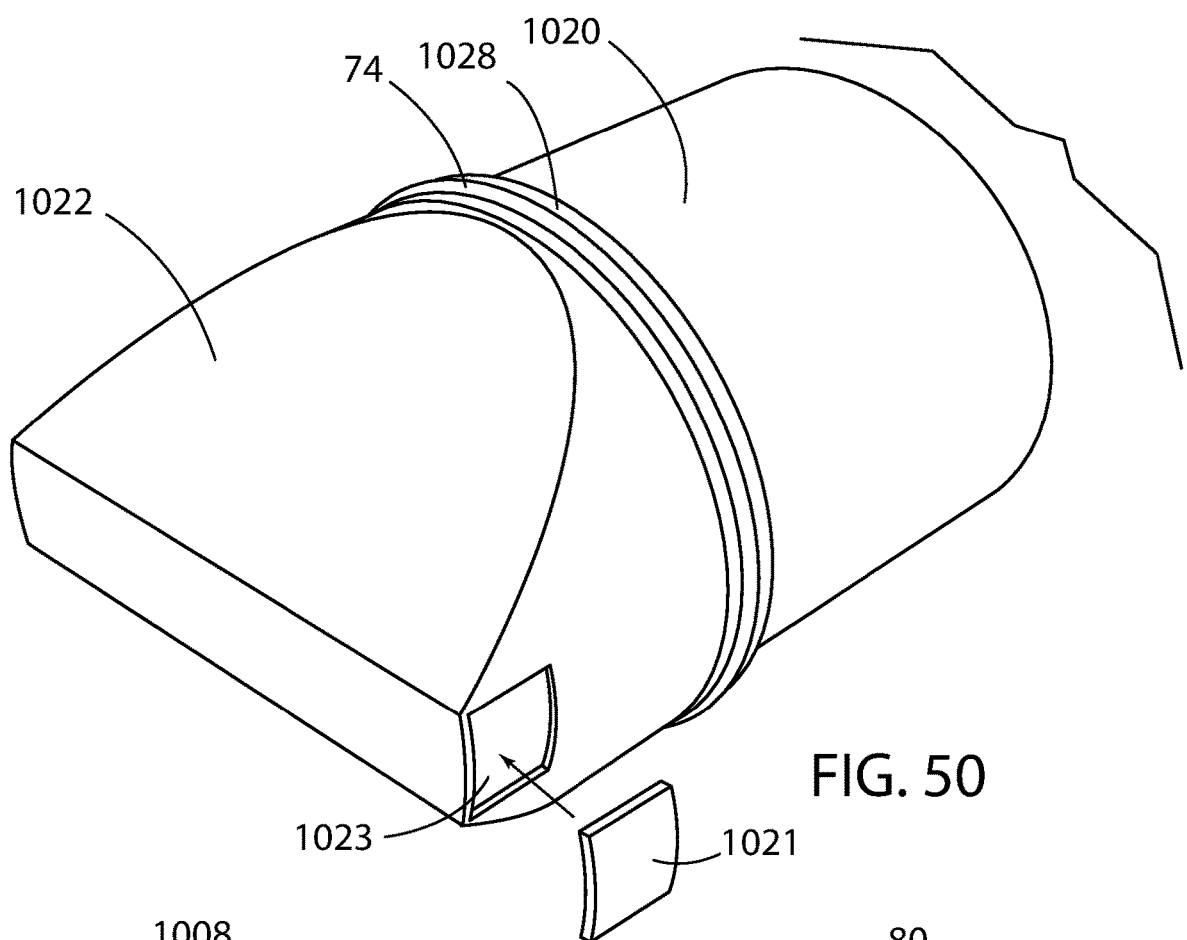
FIG. 50 illustrates a perspective view of a piston arm of the embodiment of FIG. 37.
Figure 51:
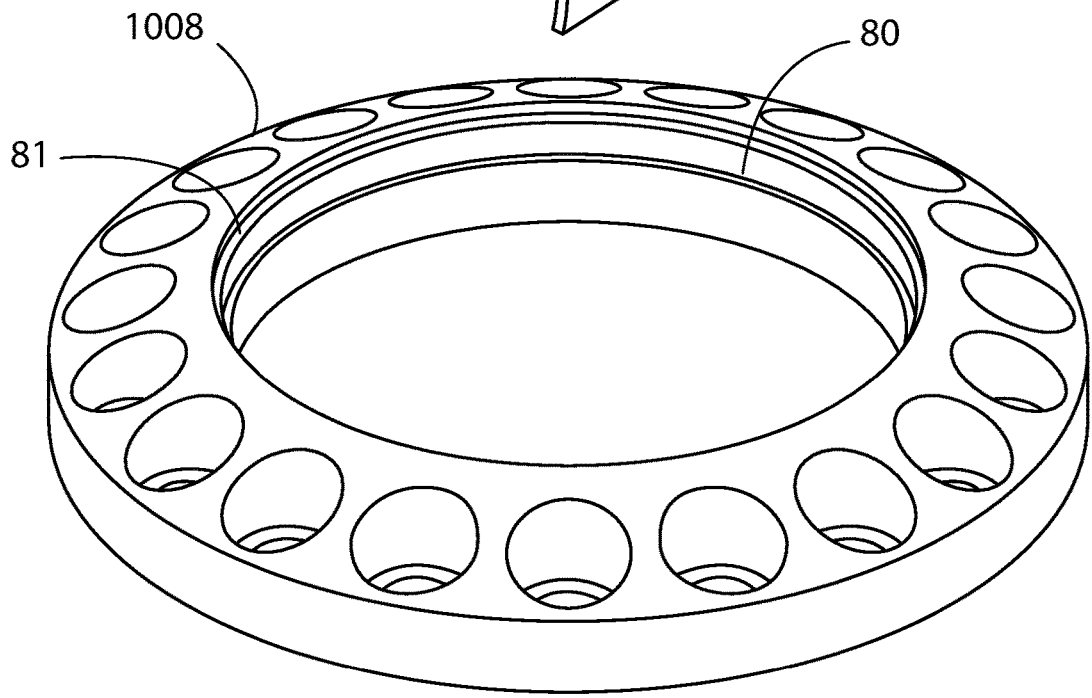
FIG. 51 illustrates a perspective view of a flange of the embodiment of FIG. 37.

FIG. 38 illustrates a cutaway top view of the present embodiments according to FIG. 37 with the hydraulic pistons within a piston assembly 1014 and blades exposed in a retracted position. FIG. 39 illustrates a cutaway top view of the present embodiments according to FIG. 37 with the hydraulic pistons and blades exposed in an extended position. Preferably, the cutting head has 5 cylinders, though it is noted herein that different cylinder configurations are possible within sound engineering practices considering the materials to be cut, diameter of the pile, and the like. With fewer cylinders, fewer blades are needed which but would need to be stronger and longer. As shown in FIGS. 38 and 39 hydraulic chamber 1018 receives a piston 1020 having a piston end 1022; cylinder rings channels 1024; piston cylinder 1026; piston stop 1028; conduits 83/82 from hose 1068 to receive hydraulic fluid to retract blade; housing stem 1032 for main hydraulic fluid conduit; and conduit 1036 for hydraulic fluid. Piston travel is shown at 1034. As shown in FIG. 50, piston end 1022 can have a wear band well 1023 to receive a wear band 1021.

Thus, as hydraulic fluid is pumped into hydraulic chamber 1018 via conduit 1036, pressure is placed on the surface of piston ends 1002 to extend pistons 1020 radially through piston cylinder 1026 up to the point at which it extends through the work piece/pile (See FIG. 39) or ultimately, no further then when piston stop 1028 reaches the stop 1030 of flange retainer ring 1008 which is the end of piston cylinder 1026.

Once fully extended, the blades may be retrieved/retracted by the configuration shown (for example, see FIGS. 7A, 7B, 38, 39, 57 and 58) where there is a gap (see FIG. 39 at dimension 1025) of about 0.1-4 mm (preferably about 5 thousandths of an inch (or about 0.13 mm) in the piston cylinder 1026 between the cylinder wall 70 and the piston 1020 to allow for hydraulic fluid to enter the space distally relative to the cylinder seals to push the pistons back into the housing to a retracted position (FIG. 38). Flange retainer ring 1008 has seals 80 and 81 such as shown in FIGS. 38, 39, 57 and 58 to seal the hydraulic fluid used to push the piston back to its retracted position. In other words, there is a first hydraulic pump/system to drive the positions outwardly from the center of the cutting head and a second hydraulic pump/system to push the cylinders back to their retracted position from about the periphery of the cutting head. The barrier between the two systems is shown by way of a non-limiting example as cylinder seals 74 (see e.g., FIG. 2). It is noted that the hydraulic force may originate from a single pump/power pack with a valve or a cross-over to switch to one system or the other. Alternately, separate pumps may be used.

Figure 41:
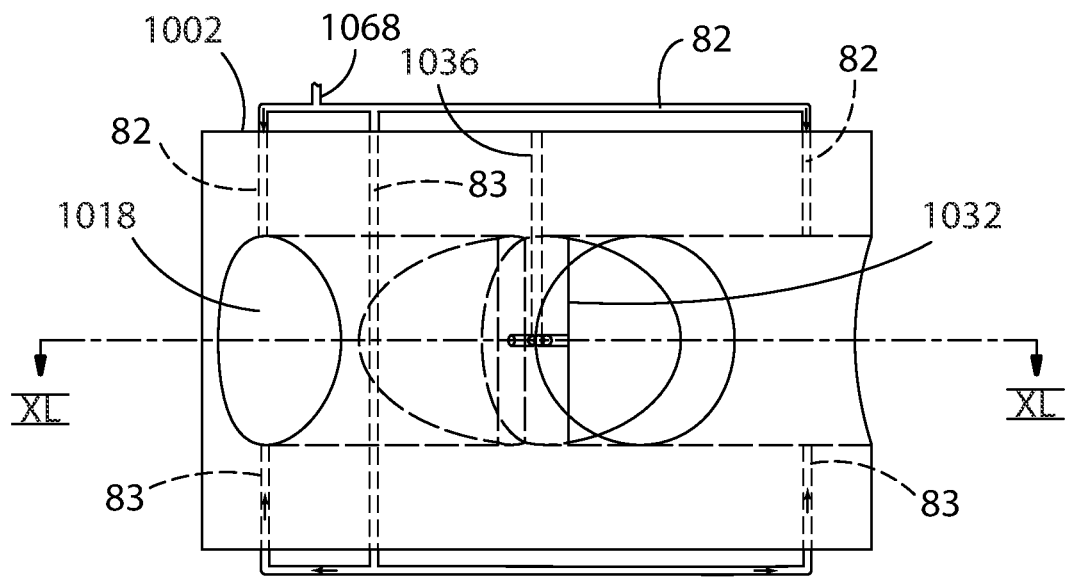
FIG. 41 illustrates a side view of a main casing of the embodiment of FIG. 37.
Figure 42:
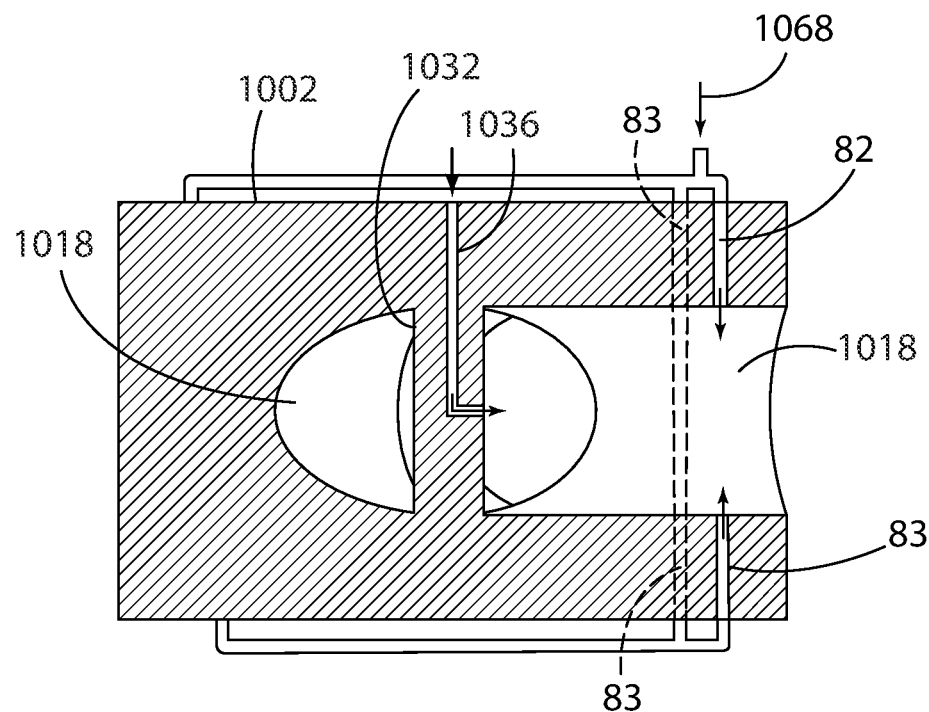
FIG. 42 illustrates a cross-sectional view of the entire main casing of FIG. 37 taken along section lines XLII-XLII of FIG. 40 though showing the entire elevational cross-section of the cutting head 1002.
Figure 43:
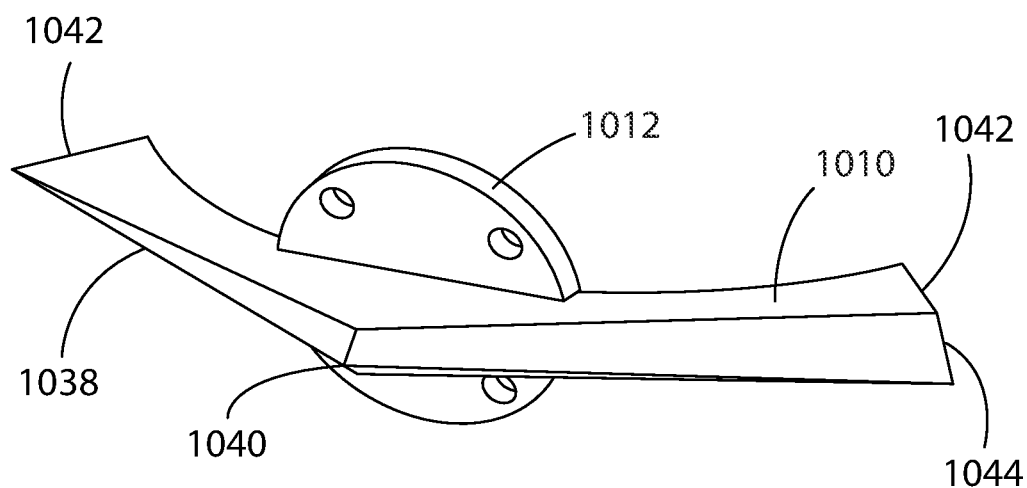
FIG. 43 illustrates a perspective view of a blade assembly of the embodiment of FIG. 37.
Figure 44:
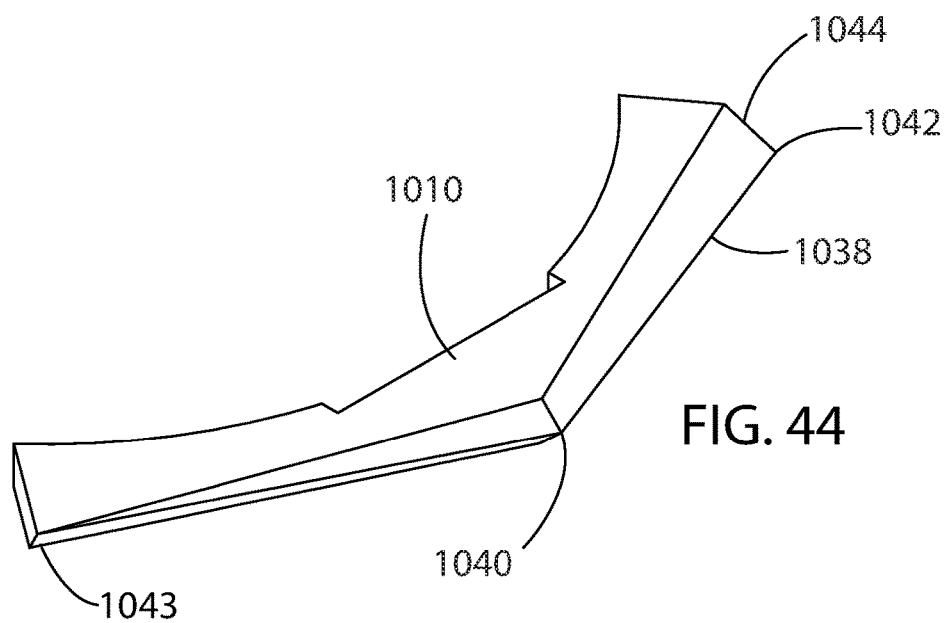
FIG. 44 illustrates a top front perspective view of a blade of the embodiment of FIG. 37.
Figure 45:
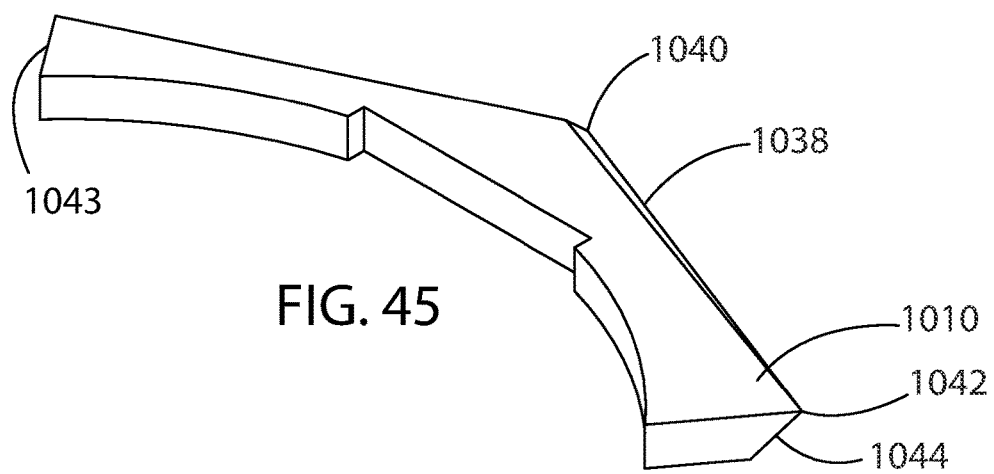
FIG. 45 illustrates a top rear perspective view of a blade of the embodiment of FIG. 37.

In summary, the retraction system is shown in a more schematic fashion in FIGS. 41 and 42. A single hydraulic fluid line 1068 splits to deliver fluid to the top of the piston chamber (line 82) and to deliver fluid to the bottom of the piston chamber (line 83). Line 82 daisy chains or splits to deliver fluid into the tops of each piston chamber. Line 83 travels through housing 1000 and comes out at the bottom and similarly daisy chains or splits to deliver fluid into the bottoms of each piston chamber. It is noted that for clarity and simplicity of understanding, not all of the fluid lines to each piston are shown. FIG. 39 shows the position along the cylinder wall in the housing where fluid lines enter the piston cavity 1026. Again, seals 80 and 82 in the flange ring are stationary to allow force against seal 74 to push the piston to a retracted position. To push the pistons out while cutting through a pile, fluid is delivered to via conduit 1036, which can be daisy chained into each of the cylinder. These configurations are exemplary and it is noted that many other variations are possible within the scope of the present embodiments.

Figure 57:
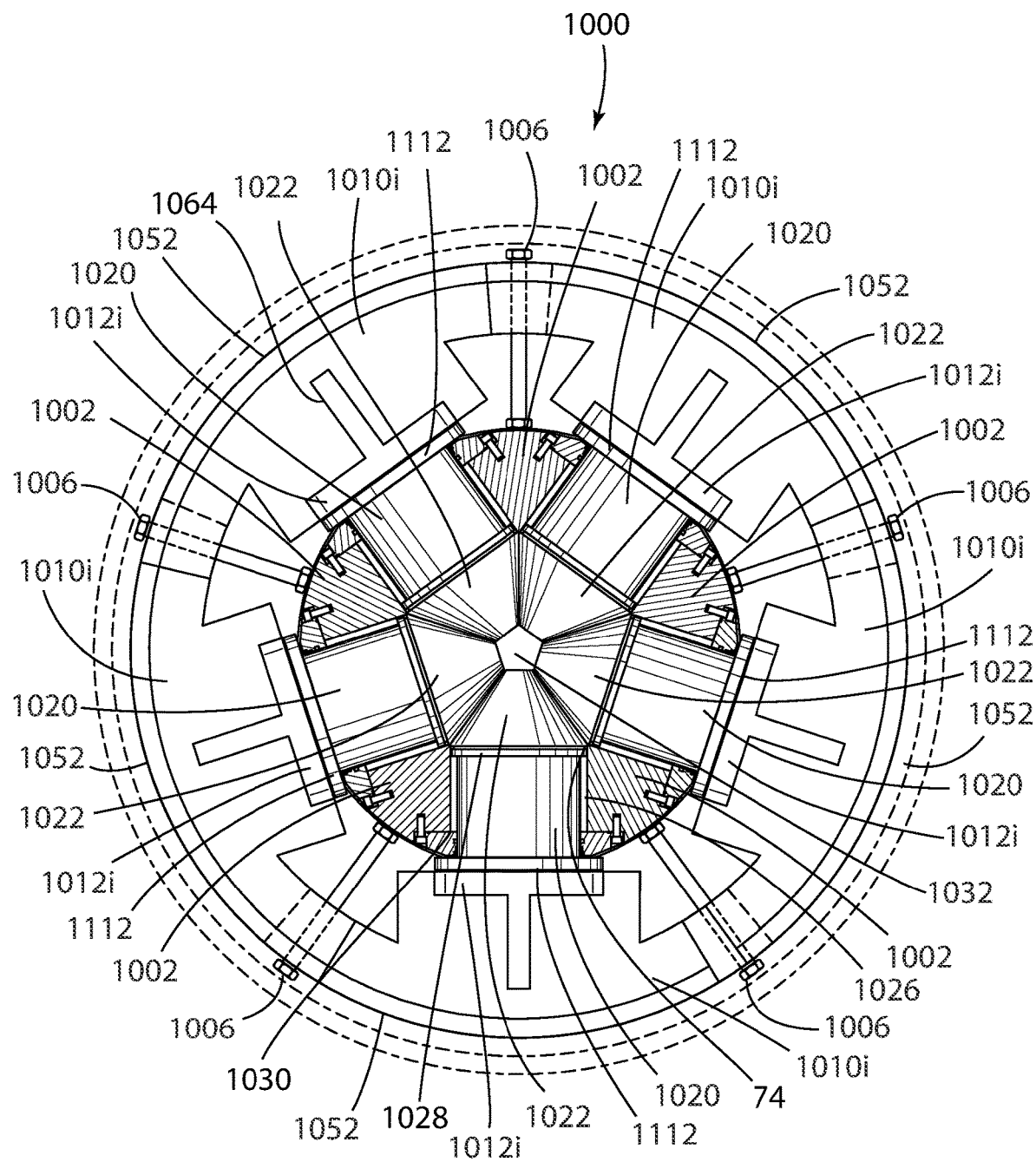
FIG. 57 illustrates a cutaway top view of the present embodiments according to FIG. 52 with the hydraulic pistons and blades exposed in a retracted position.
Figure 58:
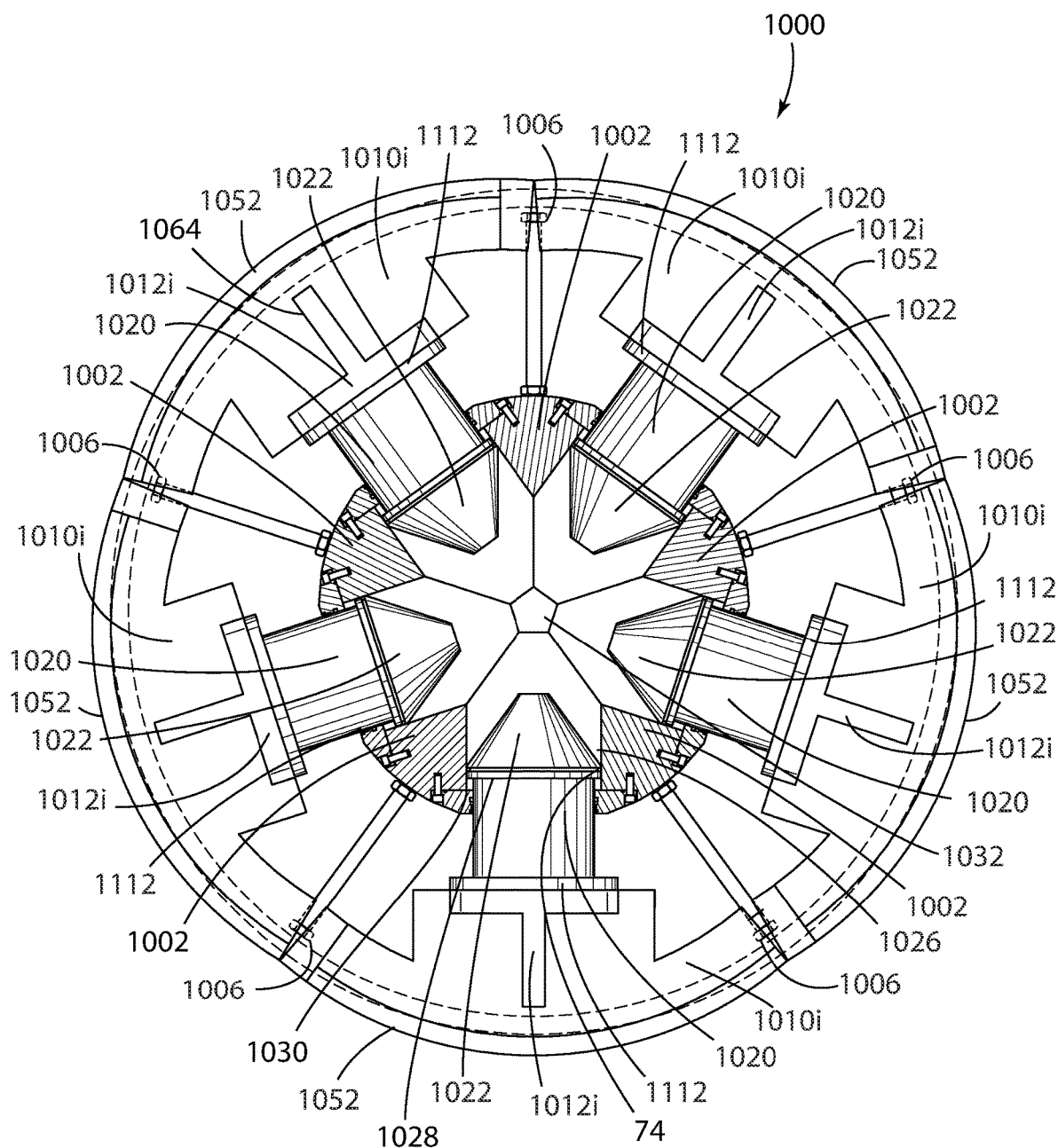
FIG. 58 illustrates a cutaway top view of the present embodiments according to FIG. 52 with the hydraulic pistons and blades exposed in an extended position.

This same housing and piston assembly configuration is shown in FIGS. 52, 57 and 58 for an alternate blade configuration 1010i. FIG. 52 illustrates a side view of the present embodiments of FIGS. 57 and 58 according to another approach with the hydraulic pistons in a retracted position and with curved blades in a planar array with box-joint-like/stepped edges. A curved blade edge configuration can be used to crimp the piling or potentially to cut the piling. Although a curved blade is shown, a piercing point/arrow may also be used and is preferable for cutting a pile (See, e.g., point 1040 of FIG. 44).

Figure 46:
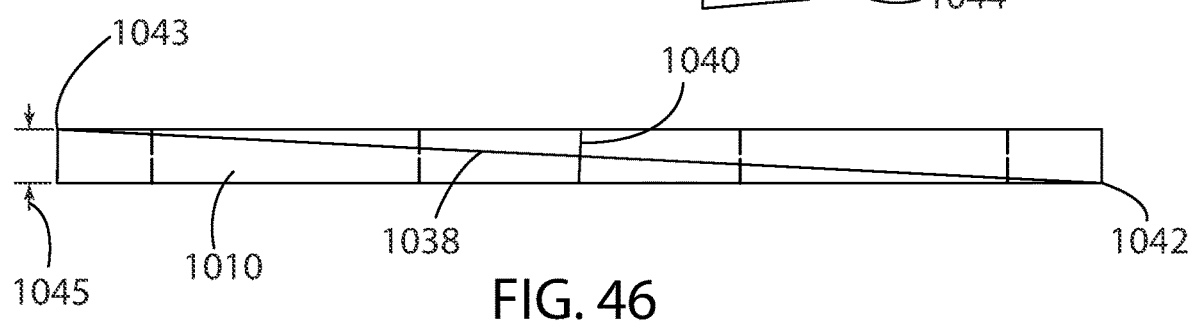
FIG. 46 illustrates a front view of a blade of the embodiment of FIG. 37.
Figure 47:
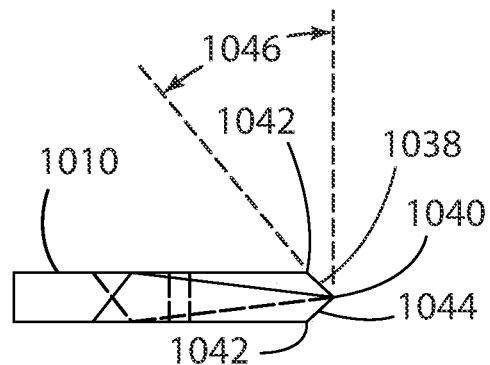
FIG. 47 illustrates a side view of a blade of the embodiment of FIG. 37.
Figure 48:
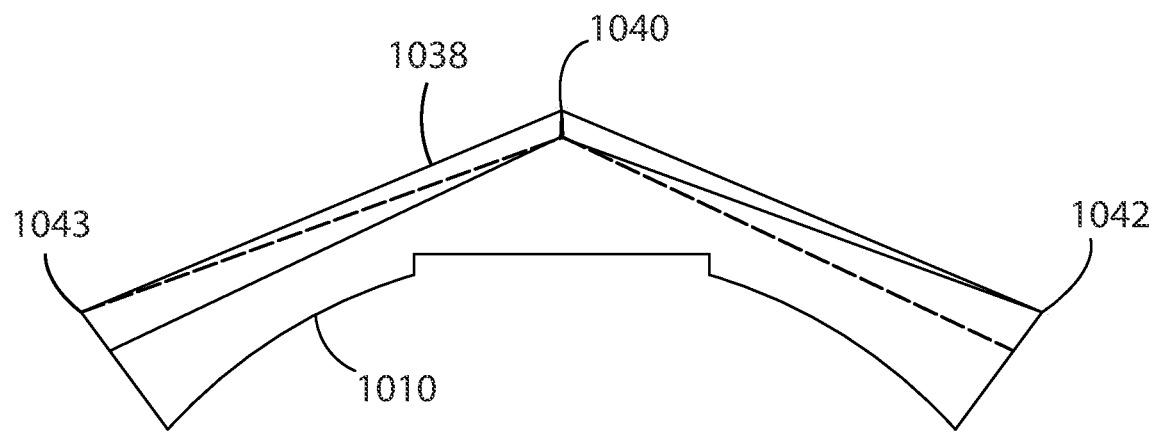
FIG. 48 illustrates a top view of a blade of the embodiment of FIG. 37.
Figure 49:
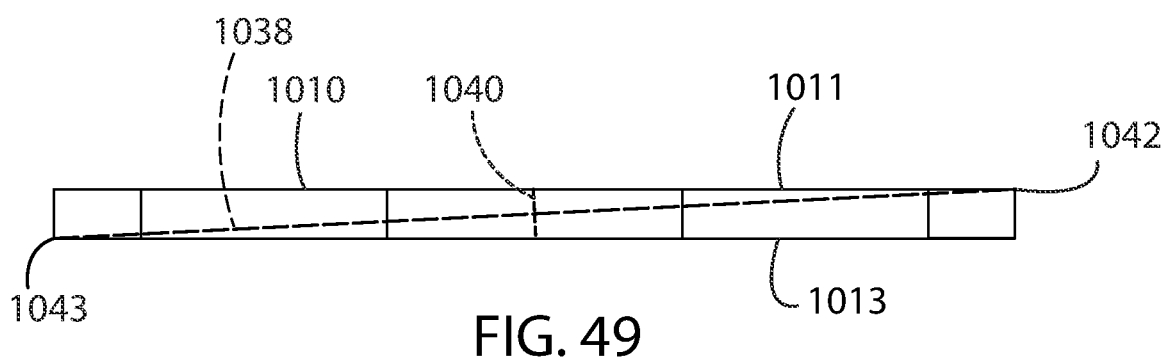
FIG. 49 illustrates a rear view of a blade of the embodiment of FIG. 37.

Housing 1000 is shown herein with different blade configurations. It is noted that these blade configurations are exemplary and that other blade configurations are possible. One possible blade configuration of alternate cutting head 1000 is shown in as blade 1010 in FIGS. 43-49. Blade 1010 has a blade edge 1038; a blade tip 1040; blade ends 1042 and 1043; a blade end bevel 1044; a blade angle 1046 (FIG. 47). Blade 1010 is mounted to piston assembly 1014 by blade bracket 1012 (FIG. 37). Blade 1010 in this configuration may be mounted on blade bracket 1012, or the bracket and blade can be integral. Blade 1010 may be hardened steel known in the art configured to cut through steel piles of various thicknesses such as one to three inches, or even one-half inch pipe like gas line. Blade 1010 lateral edges 1042 can optionally have angled sides 1044 of about 30 degrees, and a blade edge 1038 angle 1046 preferably of about 45 degrees. It is noted though that in other embodiments, the blade edge angle can be between 60 degrees and 0 degrees; the blade edge can also rounded, acute or even flat/blunt (i.e., angle 1046 to be 0 degrees). Blade 1010 has a blade edge 1038 that can be curved (see e.g., FIG. 55), or have a point 1040 to allow piercing of the pile to start a cut. Blade edge 1038 is configured to start, for example, at the corner of a blade end (shown as distal end 1042) and extend diagonally from a first side 1011 of blade 1010 (FIG. 49) to a second side 1013 of distal end 1043.

Accordingly, as shown in FIG. 37, blades 1010 are overlapped on each other like fallen dominoes (or overlapping shingles) arranged in a circle, but also configured that blade edges 1038 are adjacent to one another between blades 1010. This arrangement offer advantages not known in the art. It obviates the need for a stepped blade as shown in FIGS. 3 and 52. This provides a stronger blade while providing a nearly continuous blade cutting surface with the cutting edge on nearly the same plane due to the angled orientation of the blade to match the thickness of the blade and the diagonal of the blade edge 1038.

Blade configuration 1010i, as shown in FIGS. 53-56, has blades with a cutting edge all on the same plane 1050 (FIG. 52) circumferentially. Blade 1010i is mounted to piston assembly 1014 by blade bracket 1012i (FIG. 53), which has a brace 1064 having a stop 1066. Blade 1010i, as shown, has a curved blade edge 1052; bevel angle 1056; box-cut dimension 1058; first box-cut 1060; and second box-cut 1062. Blade configuration 1010i is similar to the cutter step 48 to allow blade overlap in retracted position in the cutter configuration shown in FIG. 3. In FIG. 3 though, casing 52 is large enough in diameter to retract the blade entirely within its diameter.

The housing configurations of the housings of FIGS. 37 and 52 allow for a smaller casing diameter and potentially larger and/or fewer blades. One advantage of the larger diameter housing is that the retracted blades are protected while being lowered into the workpiece (pile). This is solved in the embodiments of housing 1000 with the addition of spacers 1006, which can be adjustable to adapt to protect different sized blades and/or different sized piles to be cut. Dimension 1058 (See FIG. 54), similar to step 48, is configured to overlap with the adjacent blade in equal dimension (i.e., step 1062 overlaps step 1060 of the adjacent blade) and proportion to allow near full overlapping in the retracted position. This allows for blade edges 1052 of the blade array to engage along the entire circumference of pile 1016 while extended through the pile (FIG. 58) while being able to retract in the overlapping configuration of FIG. 57.

In either position (extend or retracted) or during retraction or extension of the blades 1010i, blade edge 1052 of all the blades lie along plane 1050 (FIG. 52). Blade angle 1056 can be about 90 degrees to maintain enough mass to retain strength the blade at the stepped portions, while still being able to cut through a pile. Other dimensions are possible though given the strength the of the blade material or the strength of the material to be cut. Blade material in all the embodiments herein can be hardened steel known in the art. To add strength of this blade configuration, blade bracket 1012i can have a brace 1064 which ends with a stop 1066 to stop the further extension of the piston assembly. Also, unlike blade 60 of FIG. 3, blade 1010i has a curved blade edge 1052. Blades can vary by thickness for the intended task but are preferably about 1 inch to about 1.75 inches in thickness such as shown in FIG. 46 at 1045.

While several embodiments of the present invention have been shown and described in detail, it to be understood that various changes and modifications could be made without departing from the scope of the invention.

The drawings and the foregoing descriptions are not intended to represent the only forms of assemblies in regard to the details of construction. Changes in form and in proportion of parts, as well as the substitution of equivalents, are contemplated as circumstances may suggest or render expedient.

While the embodiments have been described in conjunction with specific embodiments, it is evident that many alternatives, modifications and variations will be apparent to those skilled in the art in light of the foregoing description. Accordingly, the present embodiments attempt to embrace all such alternatives, modifications and variations that fall within the spirit and scope of the appended claims. Throughout this specification and the drawings and figures associated with this specification, numerical labels of previously shown or discussed features may be reused in another drawing figure to indicate similar features.

LIST OF REFERENCE NUMBERS 40 cutting head 40
42 crane 42
44 tube/pipe/pile 44
46 housing o-ring and channel to withstand up to about 10,000 PSI
48 cutter step to allow overlap in retracted position
50 top plate
52 main casing
54 openings for bolts 56 to clamp top plate 55 to casing 52
55 threaded holes to received bolts 56
56 bolts or other connectors to clamp top plate onto the casing
58 casing cavity to receive hydraulic fluid
60 blade
61 rounded edge in lieu of blade for crimping applications and to deform metal
62 piston head
63 piston/cutter assembly
64 piston cutter plate
66 cuter mounting bracket
68 bolts to mount cutter onto cylinder
70 cylinder wall
72 hydraulic fluid
74 cylinder seals
76 rear plate for cylinder acts as a stop
78 piston cutter bracket
80 fixed seal within cylinder wall 70 as part of the cutting head or the ringed flange
81 fixed seal within cylinder wall 70 as part of the cutting head or the ringed flange
82 second hydraulic conduit through top plate and casing for hydraulic fluid to push back pistons to retracted position from a first side (e.g., top side)
83 second conduit line through top plate and casing for hydraulic fluid to push back pistons to retracted position from a second side (e.g., bottom side)
85 O-ring
86 stop for retracted cutter
88 opening in top plate 50 to mount hydraulic hose 90
90 hydraulic hose
92 cylinder wall mate to top plate 50
100 alternate cutter with arched blade
102 bracket for blade 100
200 alternate configuration with piston having a shaft guided within the casing cavity
202 guide blocks for internal piston shaft 204
204 piston shaft
300 alternate approach with multiple hydraulic cylinders
302 cutter
304 hydraulic cylinder
306 plate to mount hydraulic cylinders
308 mount of plate to hydraulic cylinders
310 pressure sensor
400 alternate approach with multiple hydraulic cylinders
402 cutter
404 hydraulic cylinder
406 stop
408 housing plates
410 pipe
500 alternate approach with one rotatable hydraulic cylinders
502 pipe
504 cutter
506 hydraulic cylinder
508 stop
510 mounting platform
512 rotatable mount
600 alternate approach with multiple hydraulic cylinders per blade
610 cutter blade
612 hydraulic cylinders
614 track for cutter
616 frame to hold cylinders and cutter
700 alternate approach with multiple hydraulic cylinders per opposing blade pair
710 cutter blade
712 hydraulic cylinders 714 track for cutter
716 frame to hold cylinders and cutter
718 pipe
800 optional internal clamp to hold and/or rotate internal cutter
802 pipe
804 hydraulic mount to clamp end
806 hydraulic mount to base plate 810
810 base plate
812 center opening to receive retrieving line
814 clamp end
1000 alternate cutting head
1002 main casing
1004 eye hooks to attach to crane
1006 spacers extending beyond tip of retracted blade edge
1008 flange to hold piston assembly to main casing
1010 blade of FIG. 37
1010*i* alternate blade of FIG. 52
1010*ii* alternate blade of FIGS. 59-60
1011 first side of blade 1010 (FIG. 49)
1012 blade bracket of FIG. 37
1012*i* alternate blade bracket of FIG. 52
1012*ii* alternate blade bracket of FIGS. 59-60
1013 first side of blade 1010 (FIG. 49)
1014 piston assembly
1016 pile
1018 hydraulic chamber
1020 piston
1021 wear band
1022 piston end
1023 wear band well
1024 cylinder rings channels
1026 piston cylinder
1028 piston stop
1030 flange retainer ring 1008 stop
1032 housing stem for main hydraulic fluid conduit
1034 piston travel
1036 conduit for hydraulic fluid
1038 blade edge
1040 blade tip
1042 blade end
1044 blade end bevel
1045 blade thickness
1046 blade angle
1050 blade edge plane
1052 curved blade edge of blade 1010*i*
1056 bevel angle of blade 1010*i*
1058 box-cut dimension of blade 1010*i*
1060 first box-cut of blade 1010*i*
1062 second box-cut of blade 1010*i*
1064 brace of bracket 1012*i*
1066 stop of brace of bracket 1012*i*
1068 common hydraulic line for secondary hydraulic conduits 82 and 83 (FIG. 41)

I claim:

1. An assembly to cut a hollow piling, comprising:
a pressurized hydraulic fluid supply configured to supply enough force to cut through up to the circumference of a piling;
a housing having a cavity to receive the hydraulic fluid, the housing having at least one cylinder wall;
a plurality of piston assemblies slidably disposed within the at least one cylinder wall configured to extend from the at least one cylinder wall in response to an introduction of pressurized hydraulic fluid into the housing cavity;
a blade attached at a radially distal end of each piston assembly, whereby as the blade extends, a cutting force is applied to an encountered piling wall;
wherein each blade has a blade edge;
wherein the blade edges are stepped on an upper and lower surface to allow overlapping of the blades when the blades are retracted;
wherein the housing has spacers that extend to a diameter equal to or beyond a blade tip diameter in its retracted position; and
wherein the blade has a piercing point.

2. The assembly of claim 1, wherein the pressurized hydraulic fluid supply is in a range of about 4,000 to 12,000 PSI.

3. The assembly of claim 1, further comprising:
at least one sealing ring on the piston;
a fixed piston sealing ring on the cylinder wall radially distal from the at least one piston sealing ring; and
a second hydraulic supply to a cavity bordered by the cylinder wall sealing ring, the at least one piston sealing ring, and a gap between the cylinder and the cylinder wall, whereby the hydraulic supply into supplies enough force to retract a cutter/piston assembly from an extended position to a retracted position into an unpressurized housing cavity.

4. The assembly of claim 3, wherein the pressurized second hydraulic fluid supply is in a range up to 5,000 PSI (or approximately 750 pounds of force).

5. The assembly of claim 3, wherein the second hydraulic supply enters the second hydraulic supply cavity at two points.

6. The assembly of claim 5, wherein the two points the second hydraulic supply enters the second hydraulic supply cavity is at a top of the cutting head and at a bottom of the cutting head.

7. The assembly of claim 5, wherein the two points the second hydraulic supply are daisy chained from a single hydraulic force.

8. The assembly of claim 3, wherein the gap between the cylinder and the cylinder wall is between 0.1-4 mm.

9. The assembly of claim 1, wherein the housing is 36 inches, whereby it is sized to cut a 42 inch diameter pipe with a 1 inch thickness (OD 42", ID 40").

10. The assembly of claim 1, wherein the piston has a stroke of up to 5.5 inches.

11. The assembly of claim 1, wherein the piston/blade assembly has a stop in a retainer flange ring to limit extending beyond a predetermined stroke.

12. The assembly of claim 1, wherein the blade has a rounded edge to crimp rather than cutting through a pipe surface.

13. An assembly to cut a hollow piling, comprising:
a pressurized hydraulic fluid supply configured to supply enough force to force blades through up to the circumference of a piling;
a housing having a cavity to receive the hydraulic fluid, the housing having five cylinder walls;
five piston assemblies slidably disposed within the five cylinder walls configured to extend from the five cylinder walls in response to an introduction of pressurized hydraulic fluid into the housing cavity;
a blade attached at a radially distal end of each of the five piston assemblies, whereby as the blade extends, a cutting force is applied to an encountered piling wall;
wherein each blade has a blade edge;
wherein the blade is attached at an angle to allow overlapping with adjacent blades;

wherein the blade edge of each blade is configured to be adjacent to the blade edge of the adjacent blade;

wherein the housing has spacers that extend to a diameter equal to or beyond a blade tip diameter in its retracted position; and wherein the blade has a piercing point.

\* \* \* \* \*